(12) United States Patent
Matsumoto

(10) Patent No.: US 8,316,730 B2
(45) Date of Patent: Nov. 27, 2012

(54) MULTISTAGE TRANSMISSION

(75) Inventor: Shinya Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 710 days.

(21) Appl. No.: 12/557,446

(22) Filed: Sep. 10, 2009

(65) Prior Publication Data

US 2010/0071493 A1 Mar. 25, 2010

(30) Foreign Application Priority Data

Sep. 25, 2008 (JP) ................................. 2008-246753

(51) Int. Cl.
*F16H 59/00* (2006.01)
*F16H 61/00* (2006.01)
*F16H 63/00* (2006.01)
*F16H 3/08* (2006.01)

(52) U.S. Cl. ......................................... 74/337.5; 74/329

(58) Field of Classification Search ................. 74/325, 74/329, 33, 337.5; 192/76, 93
See application file for complete search history.

(56) References Cited

U.S. PATENT DOCUMENTS

| | | | | |
|---|---|---|---|---|
| 1,223,862 A * | 4/1917 | Easton | ............................. | 74/375 |
| 1,941,963 A * | 1/1934 | Wise | ............................... | 74/372 |
| 3,889,547 A * | 6/1975 | Sun et al. | ..................... | 74/336 R |
| 5,214,974 A * | 6/1993 | Morbidelli | ....................... | 74/371 |
| 5,570,608 A * | 11/1996 | Miller | .............................. | 74/325 |
| 5,689,998 A * | 11/1997 | Lee | .................................. | 74/371 |
| 6,698,303 B2 * | 3/2004 | Hoffmann et al. | ........... | 74/337.5 |
| 6,978,692 B2 * | 12/2005 | Thery | .............................. | 74/372 |
| 7,882,758 B2 * | 2/2011 | Kubo et al. | ...................... | 74/372 |
| 7,997,159 B2 * | 8/2011 | Hemphill et al. | ............... | 74/339 |
| 2009/0078071 A1 * | 3/2009 | Kubo et al. | ..................... | 74/333 |

FOREIGN PATENT DOCUMENTS

JP 2008-093702 4/2008

* cited by examiner

*Primary Examiner* — Troy Chambers
*Assistant Examiner* — Michael Gonzalez
(74) *Attorney, Agent, or Firm* — Birch, Stewart, Kolasch & Birch, LLP

(57) ABSTRACT

A multistage transmission includes a swing claw member having a pin-receiving portion adapted to receive a pin member and an engaging claw portion on respective sides opposite to each other with respect to swing center, and swung by the advancement and retraction of the pin member to allow the engaging claw portion to establish engagement and release the engagement; and biasing means for biasing the swing claw member in a swing direction of bringing the engaging claw portion into engagement. The biasing means is a compression spring interposed between the inner surface of the engaging claw portion of the swing claw member and the opposing surface of the gear shaft. The multistage transmission uses multiple swing claw members of the same kind, instead of swing claw members of different kinds.

20 Claims, 16 Drawing Sheets

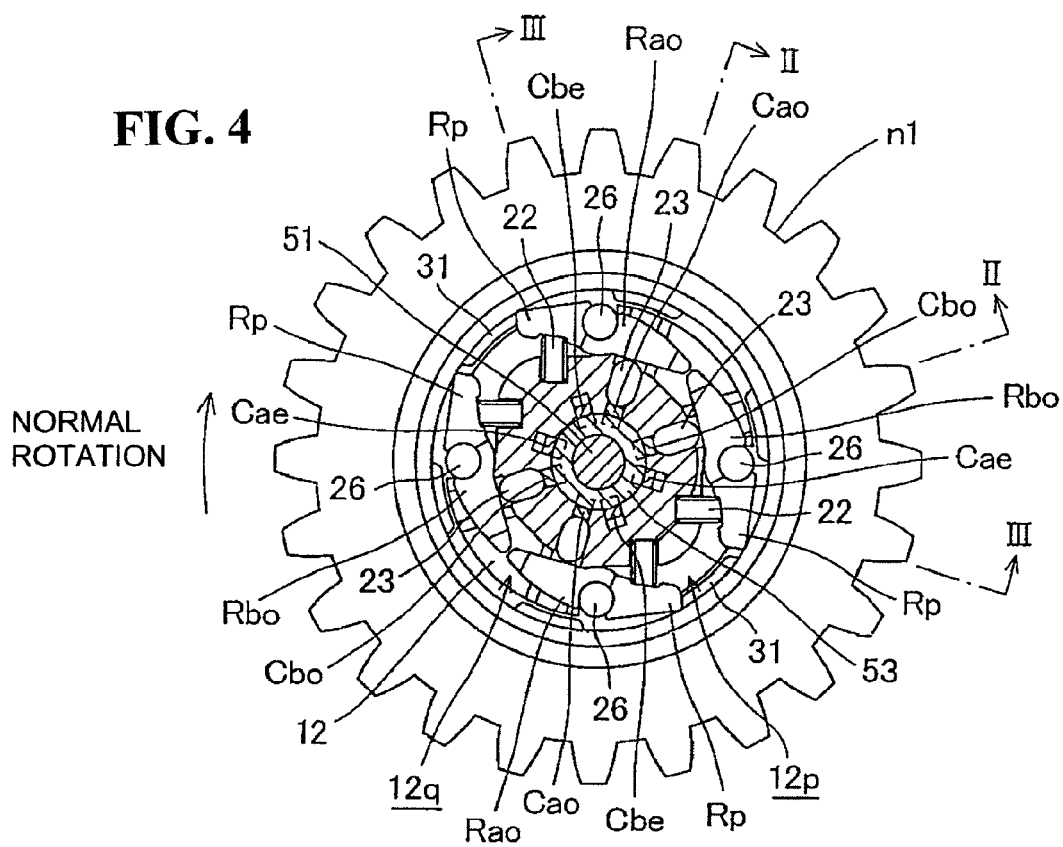
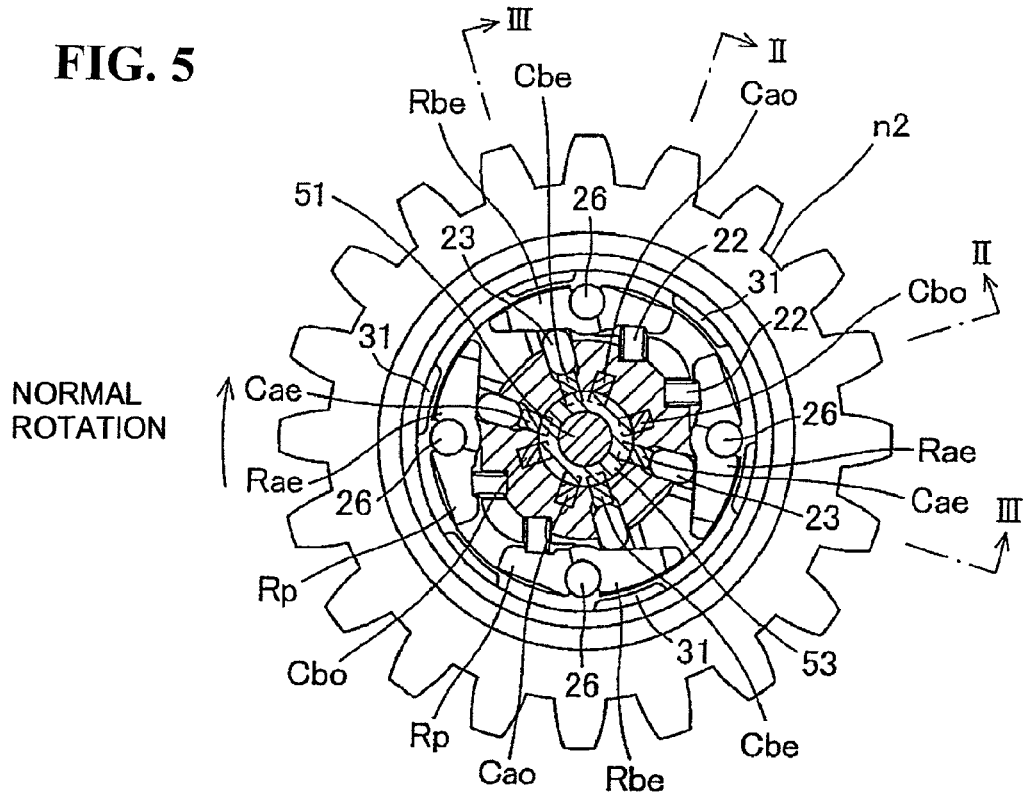

FIG. 13(a)
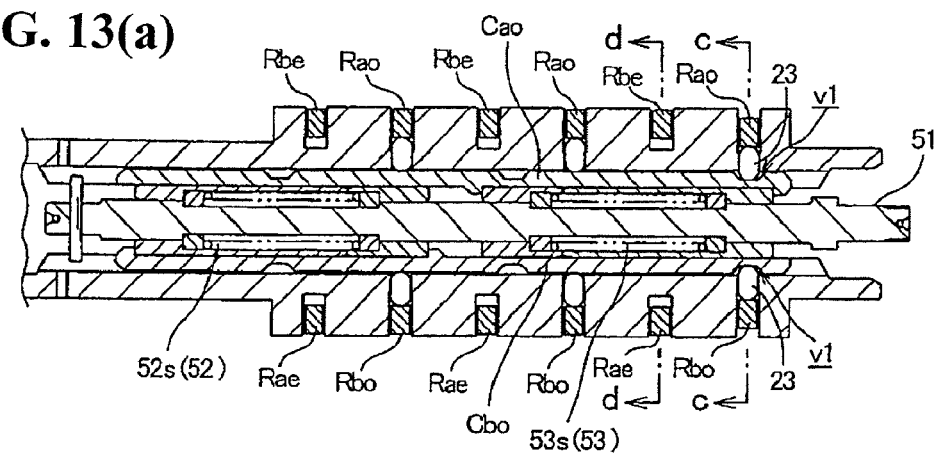
FIG. 13(b)
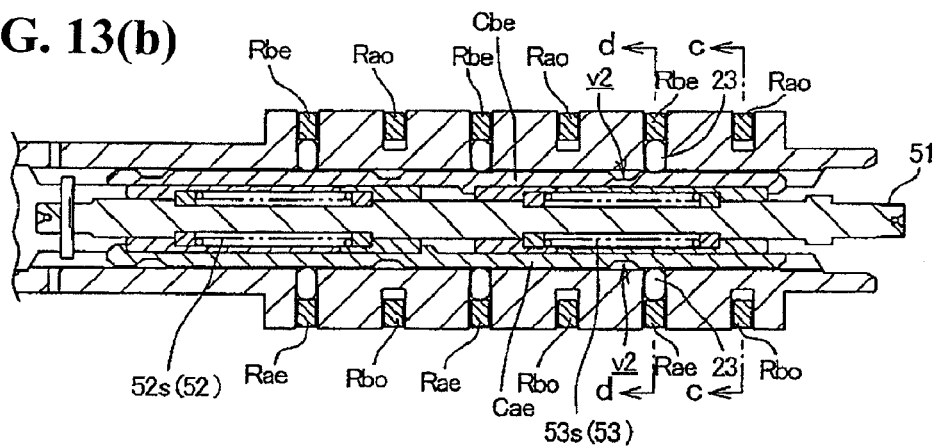
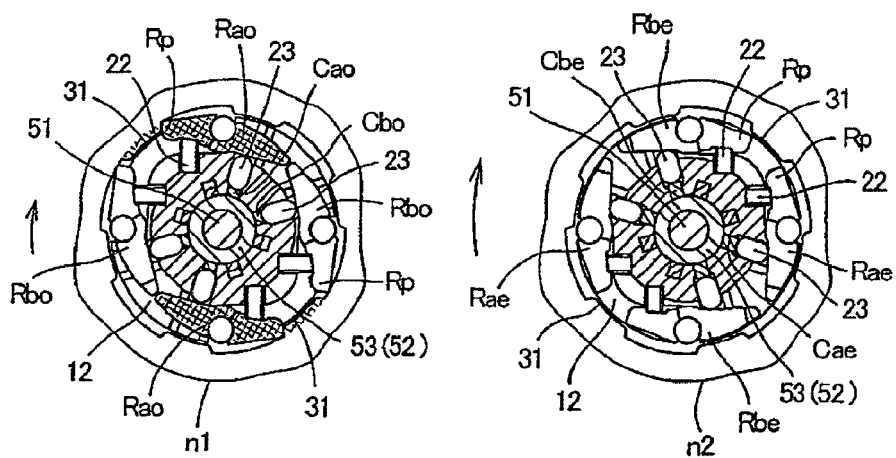
FIG. 13(c)          FIG. 13(d)

FIG. 15(a)
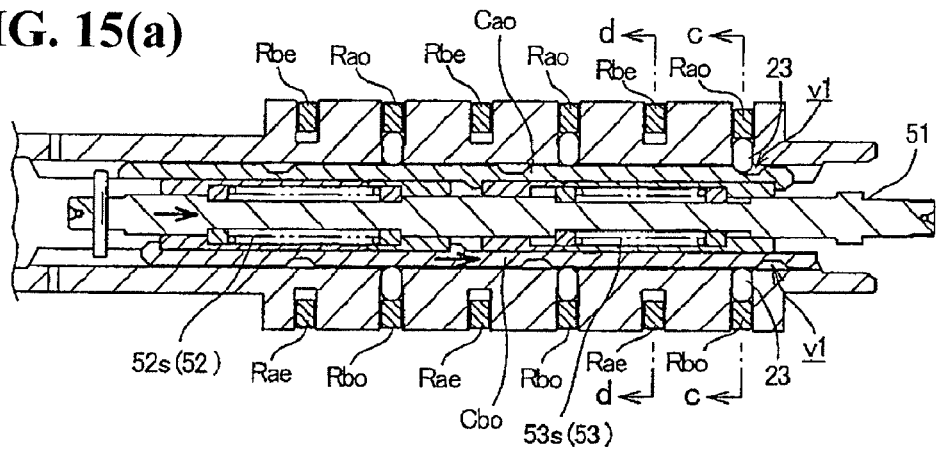
FIG. 15(b)
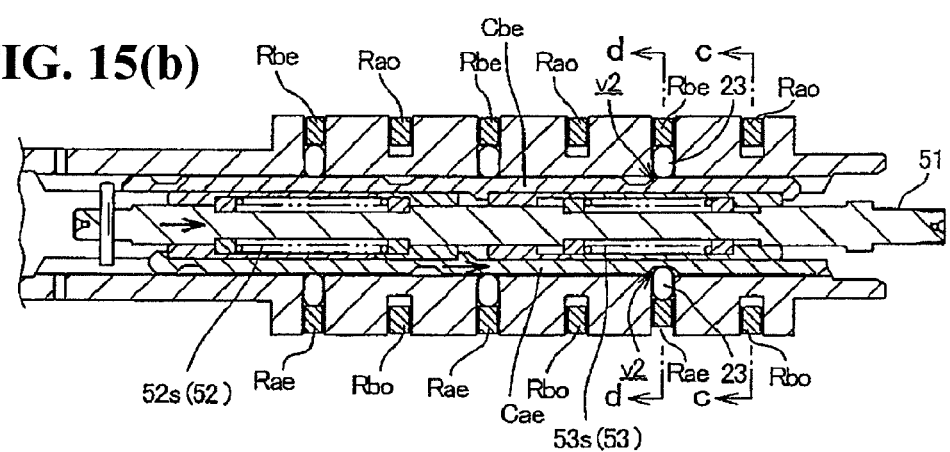
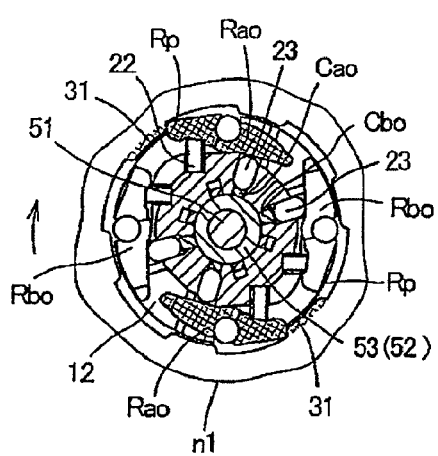
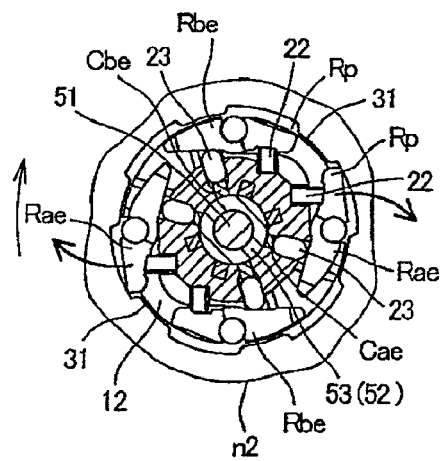
FIG. 15(c)    FIG. 15(d)

FIG. 16(a)
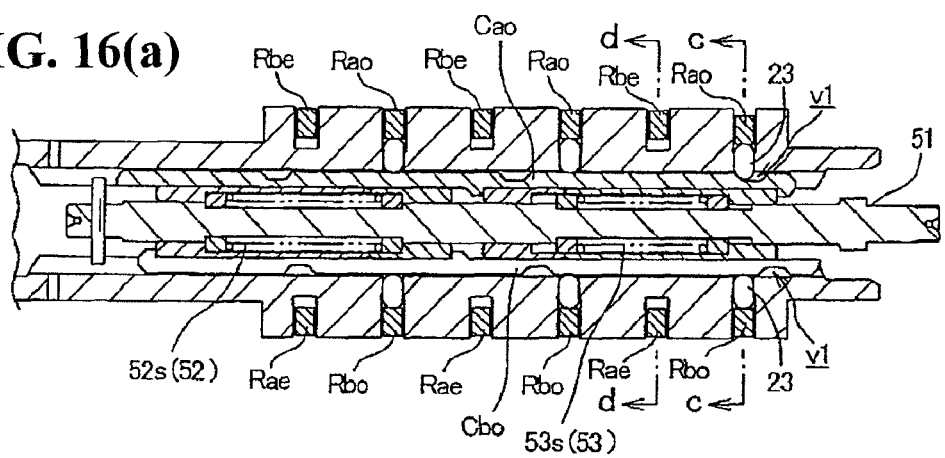
FIG. 16(b)
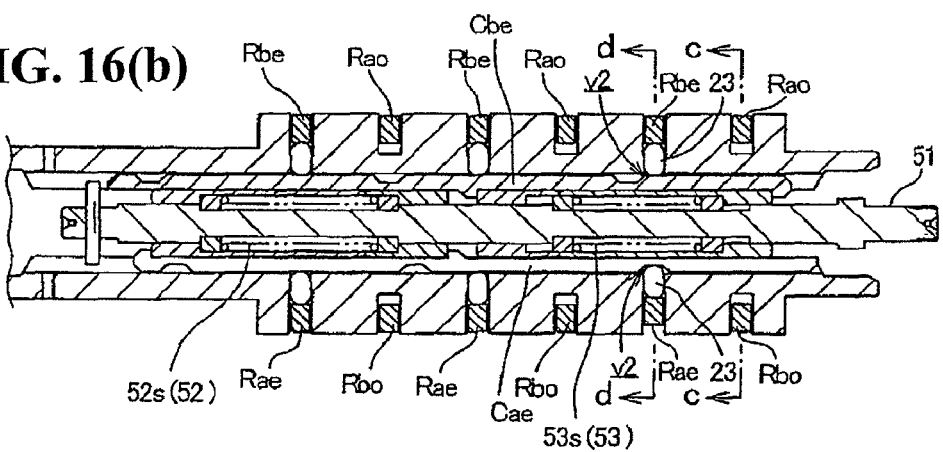
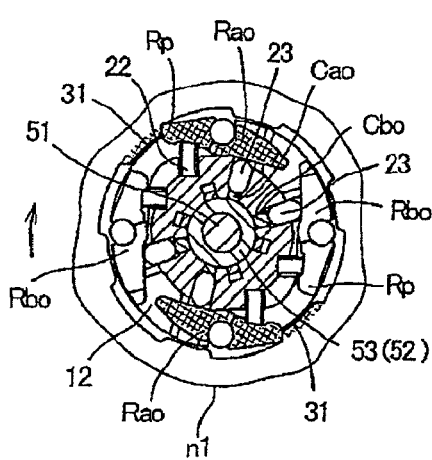
FIG. 16(c)
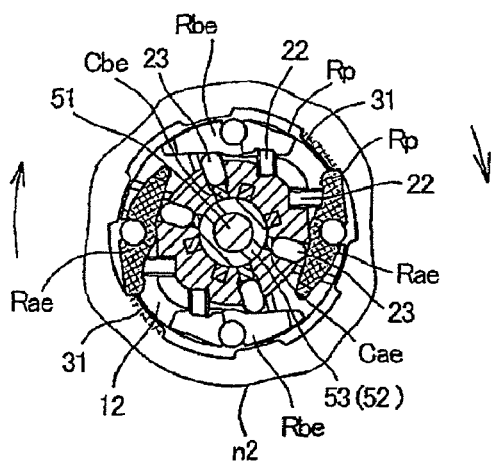
FIG. 16(d)

FIG. 17(a)
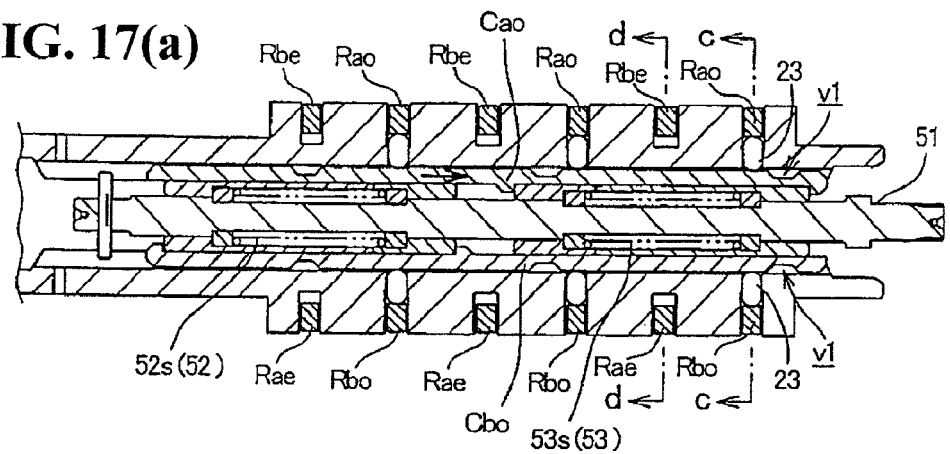
FIG. 17(b)
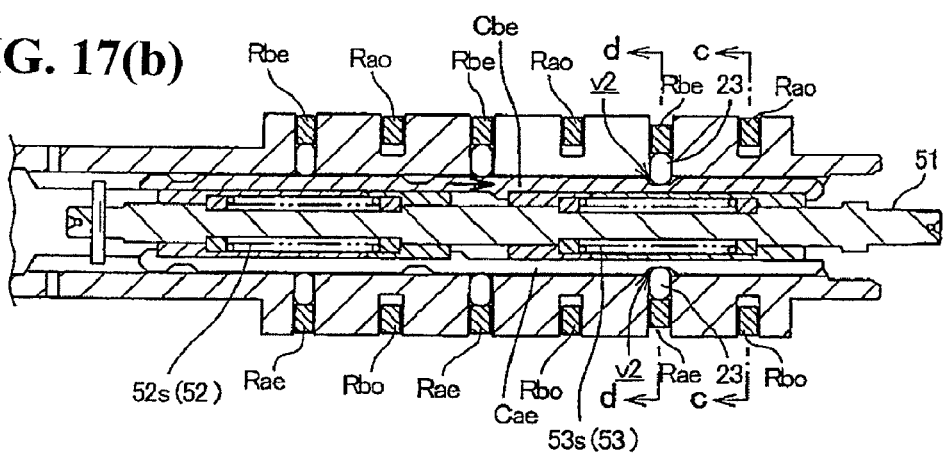
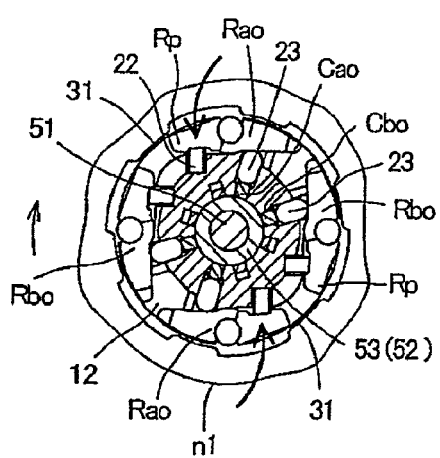
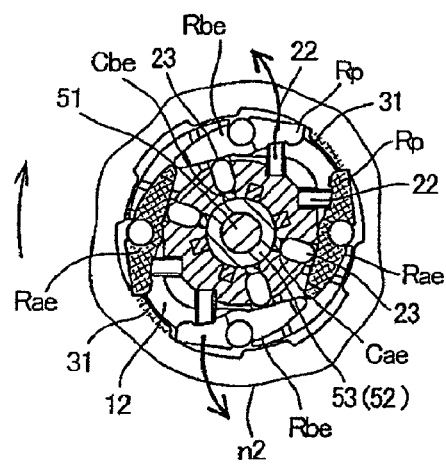
FIG. 17(c)     FIG. 17(d)

FIG. 18(a)
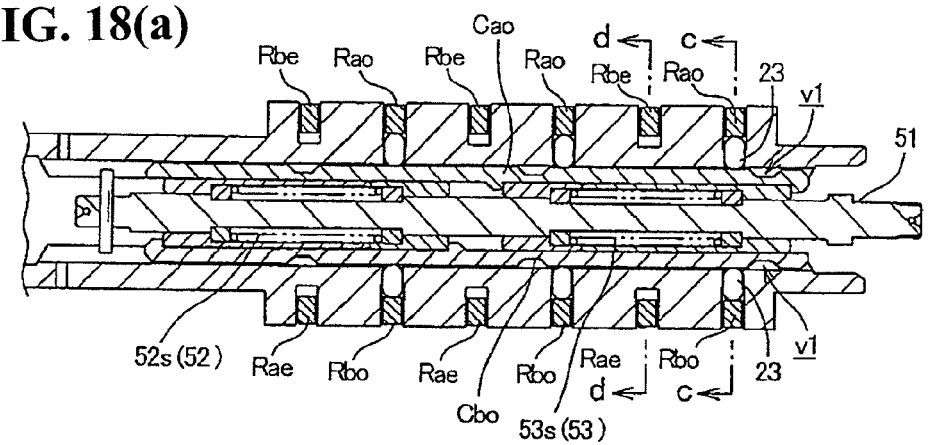
FIG. 18(b)
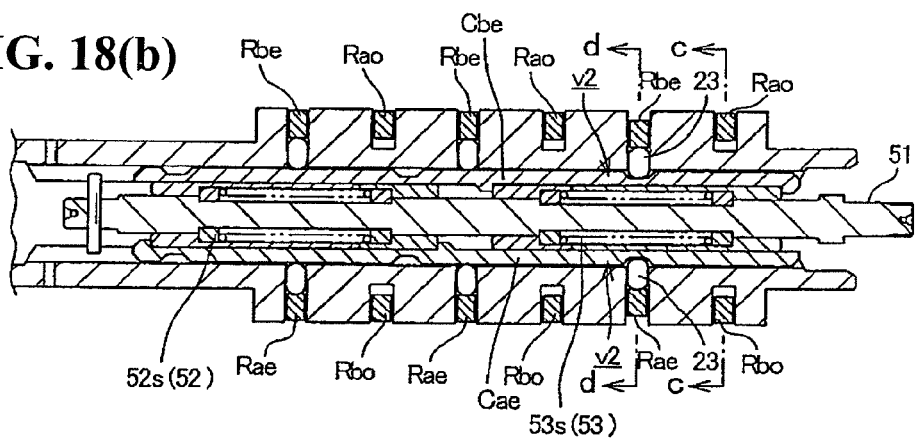
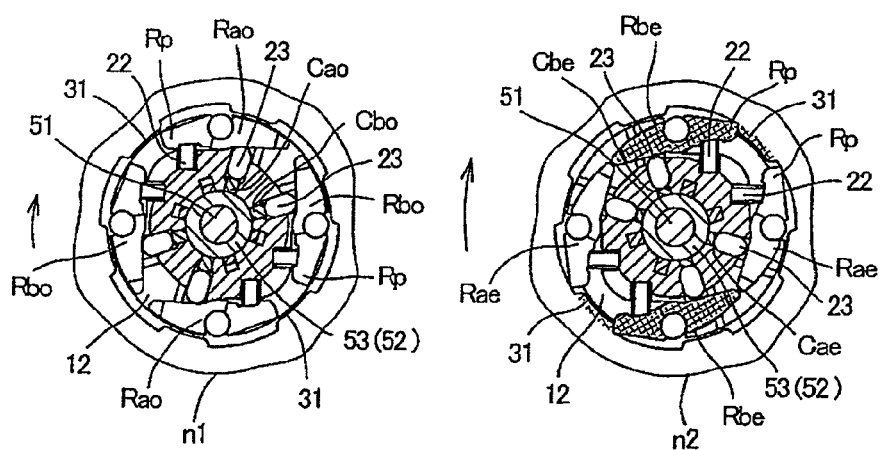
FIG. 18(c)    FIG. 18(d)

FIG. 19(a)
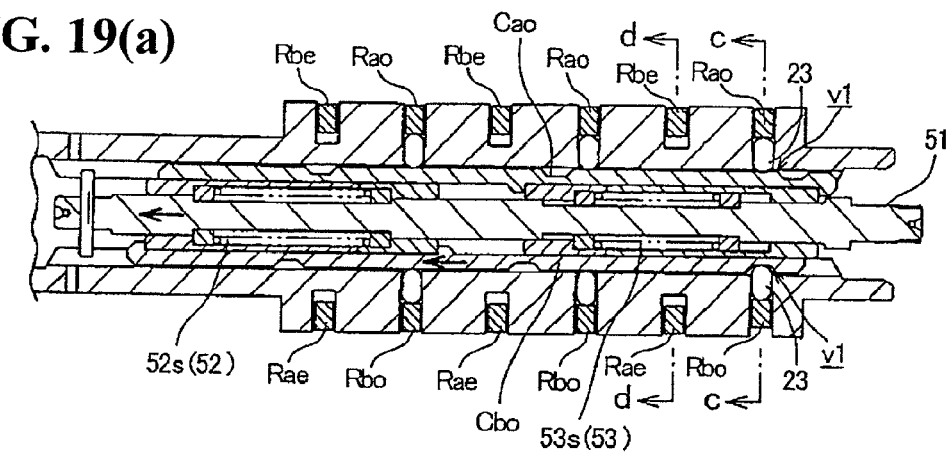
FIG. 19(b)
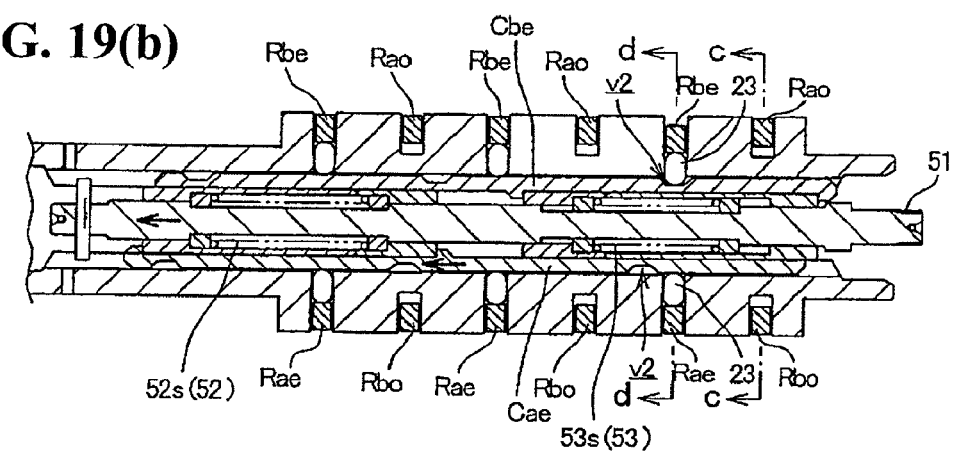
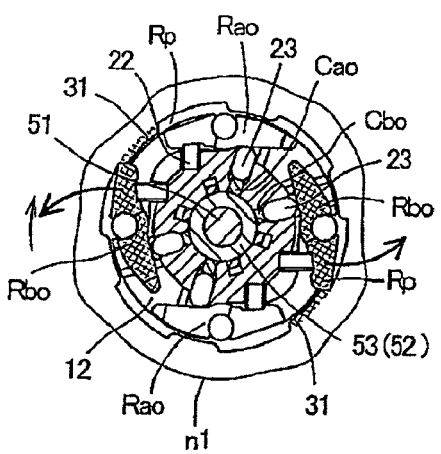
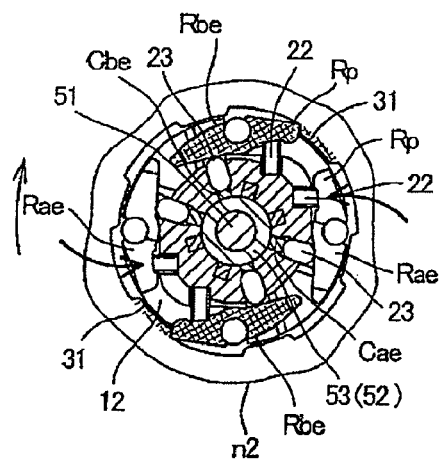
FIG. 19(c)　　　　　FIG. 19(d)

MULTISTAGE TRANSMISSION

CROSS-REFERENCE TO RELATED APPLICATION

The present application claims priority under 35 U.S.C. §119 to Japanese Patent Application No. 2008-246753, filed Sep. 25, 2008, the entire contents of which are hereby incorporated by reference.

BACKGROUND OF THE INVENTION

1. Field of the Invention

The present invention relates to a multistage transmission in which a plurality of drive gears and driven gears are rotatably supported by respective parallel gear shafts in a constant-mesh state for each speed-change stage.

2. Description of Background Art

This constant-mesh type multistage transmission is such that one of the drive gears and driven gears is secured to a gear shaft and the other is rotatably supported by the gear shaft and shifting is executed by switching a gear from the rotatable gears engaged with the gear shaft by engaging means.

The following configuration has previously been filed by the same applicant by way of example. In the configuration, a swing claw member operated by a cam member is used for engagement of the gear and the gear shaft (see Japanese Patent Application No. 2008-093702).

Engaging means of a multistage transmission disclosed Japanese Patent Application No. 2008-093702 is such that a swing claw member pivotally supported by a spindle pin provided on a gear shaft is designed to be biased in an engageable swing direction by a torsional coil spring wound around the spindle pin. In addition, a pin member abutted against a cam face of an axially sliding cam rod are advanced and retracted to swing the swing claw member to establish engagement and release the engagement.

Since the torsional coil spring is located close to the swing claw member and wound several times around the spindle pin, an axial space dedicated to the torsional coil spring is needed to enlarge the gear shaft in the axial direction.

The torsional coil spring is located close to one side of the swing claw member. In addition, a pin-receiving portion of the swing claw member adapted to receive the pin member abutted thereagainst is cut away and reduced in width at its one axial side and an engaging claw on the other side is increased in width to receive a centrifugal force largely acting thereon. Thus, the swing claw member is asymmetrical on both axial sides.

The swing claw members of two kinds in which the pin-receiving portion and the engaging claw member are arranged circumferentially oppositely to each other so as to establish engagement between the gear and the gear shaft and release the engagement in both the relative rotation directions thereof are provided on the gear shaft. However, the swing claw member per se is asymmetrical and the torsional coil spring is configured to be disposed close to one side of the swing claw member. Thus, the swing claw members of two kinds are shaped differently from each other. That is to say, the swing claw members having the same shape cannot be used.

SUMMARY AND OBJECTS OF THE INVENTION

The present invention improves such respects of the previously applied multistage transmission and aims to provide a multistage transmission that eliminates an axial space dedicated to biasing means for swingably biasing a swing claw member and that can use the swing claw members of the same kind in place of swing claw members of two kinds which establish engagement between a gear and a gear shaft and release the engagement in both relative rotation directions thereof.

According to an embodiment of the present invention, a multistage transmission includes a plurality of drive gears and driven gears that are rotatably supported by respective parallel gear shafts in a constant-mesh state for each speed-change stage. One of the plurality of drive gears and driven gears is secured to a gear shaft and engaging means provided between the other of the plurality of drive gears and driven gears and the gear shaft to establish engagement therebetween is switchably driven to execute shifting.

The engaging means includes: an engaging projection formed on an inner circumferential surface of each gear to project therefrom and have an engaging surface in a circumferential direction; a cam rod brought into axially movably slidable contact with a hollow inner circumferential surface of the gear shaft and formed with a plurality of cam grooves on a slidable contact surface at desired axial positions; a pin member insertably fitted into a through-hole radially passing through the gear shaft at a desired position and advancing and retracting while coming into alternate contact with the slidable contact surface and cam grooves of the axially moved cam rod; a swing claw member pivotally supported for swing by a spindle pin provided on the gear shaft, having a pin-receiving portion adapted to receive the pin member and an engaging claw portion coming into abutment against an engaging surface of the engaging projection, on respective sides opposite to each other with respect to the swing center, and swung by the advancement and retraction of the pin member to allow the engaging claw portion to establish engagement with and disengagement from the engaging projection; and biasing means for biasing the swing claw member in a swing direction of bringing the engaging claw portion into engagement with the engaging surface of the engaging projection; wherein the biasing means is a compression spring interposed between the inner surface of the engaging claw portion of the swing claw member and a surface of the gear shaft opposed thereto.

According to an embodiment of the present invention, the swing claw member is such that the pin-receiving portion is formed narrower in width than the engaging claw portion located on a side opposite to the pin-receiving portion with respect to the swing center.

According to an embodiment of the present invention, the compression spring is formed in an oval figure with a major axis extending in the axial direction of the gear shaft, and the oval-shaped compression spring has the major axis greater than a width of the pin-receiving portion of the swing claw member.

Effects of the invention in clued the following:

According to an embodiment of the present invention, the biasing means for swingably biasing the swing claw member is a compression spring interposed between the inner surface of the engaging claw portion of the swing claw member and the surface of the gear shaft opposed thereto. Therefore, an axial space dedicated to the spring is not necessary so that the axial enlargement of the gear shaft can be avoided.

The compression spring is disposed at the center of the axial width of the swing claw member so that the swing claw member per se can be formed symmetrical on both sides in the axial direction. Therefore, the swing claw members of two kinds adapted to establish engagement between the gear and the gear shaft and release the engagement in both relative rotation directions thereof can be made to have the same shape. That is to say, it is not necessary to prepare swing claw members different in shape from each other.

According to an embodiment of the present invention, the swing claw member is such that the pin-receiving portion is formed narrower in width than the engaging claw portion located on the side opposite to the pin-receiving portion with respect to the swing center. Therefore, a centrifugal force largely acting on the wide engaging claw portion can swing the swing claw member toward the engaging side.

Since the pin-receiving portion needs only to have the width enough to receive only the pin member, the swing claw member can be made small and the other engaging claw portion can easily be swung by the centrifugal force.

According to an embodiment of the present invention, the compression spring is formed in an oval figure with a major axis extending in the axial direction of the gear shaft, and the oval-shaped compression spring has the major axis greater than the width of the pin-receiving portion of the swing claw member. Therefore, even if the circumferential groove adapted to receive the pin-receiving portion of the swing claw member swingably fitted thereinto is formed on the gear shaft to circumferentially extend around one circle, the compression spring can be received to straddle the groove.

Thus, the machining of the gear shaft can be facilitated and the swing claw member can stably be assembled to the gear shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a cross-sectional view taken along line IV-IV of FIGS. 2 and 3;

FIG. 5 is a cross-sectional view taken along line V-V of FIGS. 2 and 3;

FIGS. 13($a$)-($d$) include explanatory views illustrating a first-speed state at the time of starting upshift;

FIGS. 15($a$)-($d$) include explanatory views illustrating the next process;

FIGS. 16($a$)-($d$) include explanatory views illustrating the next process;

FIGS. 17($a$)-($d$) include explanatory views illustrating a second-speed state at the time of completing upshift;

FIGS. 18($a$)-($d$) include explanatory views illustrating a second-speed state at the time of staring the downshift;

FIGS. 19($a$)-($d$) include explanatory views illustrating a process during the middle of the downshift operation.

DETAILED DESCRIPTION OF THE PREFERRED EMBODIMENTS

A multistage transmission 10 according to the present embodiment is configured to be built into an internal combustion engine mounted on a motorcycle.

Figure 1:
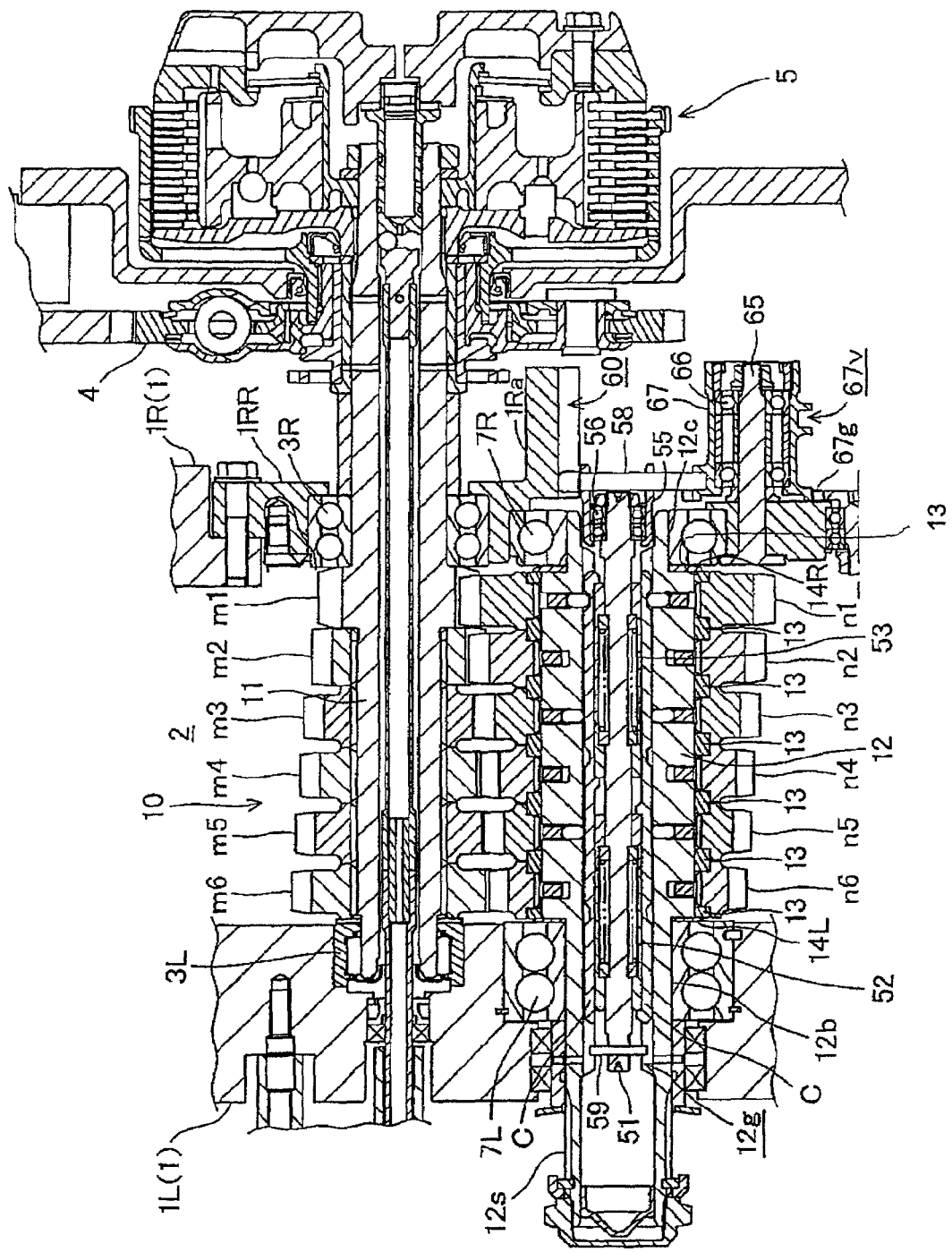
FIG. 1 is a cross-sectional view of a multistage transmission according to an embodiment of the present invention.

FIG. 1 is a cross-sectional view of the multistate transmission 10. As illustrated in FIG. 1, the multistage transmission 10 is provided in an engine case 1 shared by the internal combustion engine.

This engine case 1 is formed by combining a left engine case 1L and a right engine case 1R which are right-left split from each other. The engine case 1 forms a speed-change chamber 2. A main gear shaft 11 and a counter gear shaft 12 are rotatably supported by the speed-change chamber 2 so as to extend parallel to each other in a right-left direction.

The main gear shaft 11 is rotatably supported by a sidewall of the left engine case 1L and a sidewall 1RR of the right engine case 1R via bearings 3L and 3R, respectively. In addition, the main gear shaft 11 passes through the right bearing 3R and projects from the speed-change chamber 2 to form a right end portion at which a multiple-disk friction clutch 5 is provided.

On the left side of the friction clutch 5 a primary driven gear 4 is rotatably supported by the main gear shaft 11 so as to receive rotation of a crankshaft, not illustrated, transmitted therefrom.

The rotation of the crankshaft of the internal combustion engine is transmitted from the primary driven gear 4 to the main gear shaft 11 via the friction clutch 5 in the engagement state.

On the other hand, also the counter gear shaft 12 is rotatably supported by the sidewall of the left engine case 1L and the sidewall 1RR of the right engine case 1R via bearings 7L and 7R, respectively. In addition, the counter gear shaft 12 passes through the left bearing 7L and projects from the speed-change chamber 2 to form a left end portion thereof to which an output sprocket (not illustrated) is fixedly spline-fitted.

A drive chain wound around the output sprocket is wound around a sprocket driving a rear wheel not illustrated located rearward. In this way, the rotational power of the counter gear shaft 12 is transmitted to the rear wheel to drive the vehicle.

A drive speed-change gear m group is formed between the left and right bearings 3L, 3R on the main gear shaft 11 for rotation integral therewith.

A first drive speed-change gear m1 is formed integral with the main gear shaft 11 along the right bearing 3R. Second, third, fourth, fifth and sixth drive speed-change gears m2, m3, m4, m5 and m6 sequentially increased in diameter in the order from the right to the left are spline-fitted to the spline formed between the first drive speed-change gear m1 of the main gear shaft 11 and the left bearing 3L.

On the other hand, a drive speed-change gear n group is rotatably supported between the left and right bearings 7L, 7R by the counter gear shaft 12 via annular bearing collar members 13.

On the counter gear shaft 12, five bearing collar members 13 are externally provided at regular intervals between a right end bearing collar member 13 and left end bearing collar member 13. The right end bearing collar member 13 is externally provided via the collar member 14R provided on the left of the right bearing 7R. The left end bearing collar member 13 is externally provided via the collar member 14L provided on the right of the left bearing 7L. First, second, third, fourth, fifth and sixth driven speed-change gears n1, n2, n3, n4, n5 and n6 sequentially reduced in diameter in the order from the right to the left are rotatably supported so as to be each straddled between adjacent bearing color members 13, 13 of the totally seven bearing collar members 13.

The first, second, third, fourth, fifth and sixth drive speed-change gears m1, m2, m3, m4, m5 and m6 rotating integrally with the main gear shaft 11 constantly mesh with the first, second, third, fourth, fifth and sixth driven speed-change gears n1, n2, n3, n4, n5 and n6, respectively, rotatably supported by the counter gear shaft 12.

Meshing engagement between the first drive speed-change gear m1 and the first driven speed-change gear n1 establishes a first-speed largest in reduction ratio. Meshing engagement between the sixth drive speed-change gear m6 and the sixth driven speed-change gear n6 establishes a sixth-speed smallest in reduction ratio. The reduction ratios therebetween are sequentially reduced to establish second-, third-, fourth- and fifth-speeds.

Odd-numbered stage gears (the first, third and fifth driven speed-change gears n1, n3 and n5) in which speed-change stages are odd-numbered stages and even-numbered stage gears (the second, fourth and sixth speed-change gears n2, n4 and n6) in which speed-change stages are even-numbered stages are alternately arranged on the counter gear shaft 12.

Engaging means 20 capable of engaging the driven speed-change gears n are built into the counter gear shaft 12 formed like a hollow cylinder as described later. Totally eight cam rods C (Cao, Cao, Cae, Cae, Cbo, Cbo, Cbe, Cbe) which are one constituent element of the engaging means 20 are axially movably fitted into cam guide grooves 12g described later formed in the hollow inner circumferential surface of the counter gear shaft 12. The eight cam rods C contain four kinds of cam rods: two cam rods for each kind.

A control rod 51 which is one constituent element of shift drive means 50 for driving the cam rods C for shifting is inserted into a hollow central axis of the counter gear shaft 12. The axial movement of the control rod 51 axially moves the cam rods C through interlocking with lost motion mechanisms 52 and 53.

A mechanism for axially moving the control rod 51 is provided in the right engine case 1R.

The axial movement of the control rod 51 axially moves the cam rods C via the lost motion mechanisms 52 and 53. The movement of the cam rods C allows the engaging means 20 built into the counter gear shaft 12 to execute selective engagement of each driven speed-change gear n with the counter gear shaft 12 for shifting.

Figure 6:
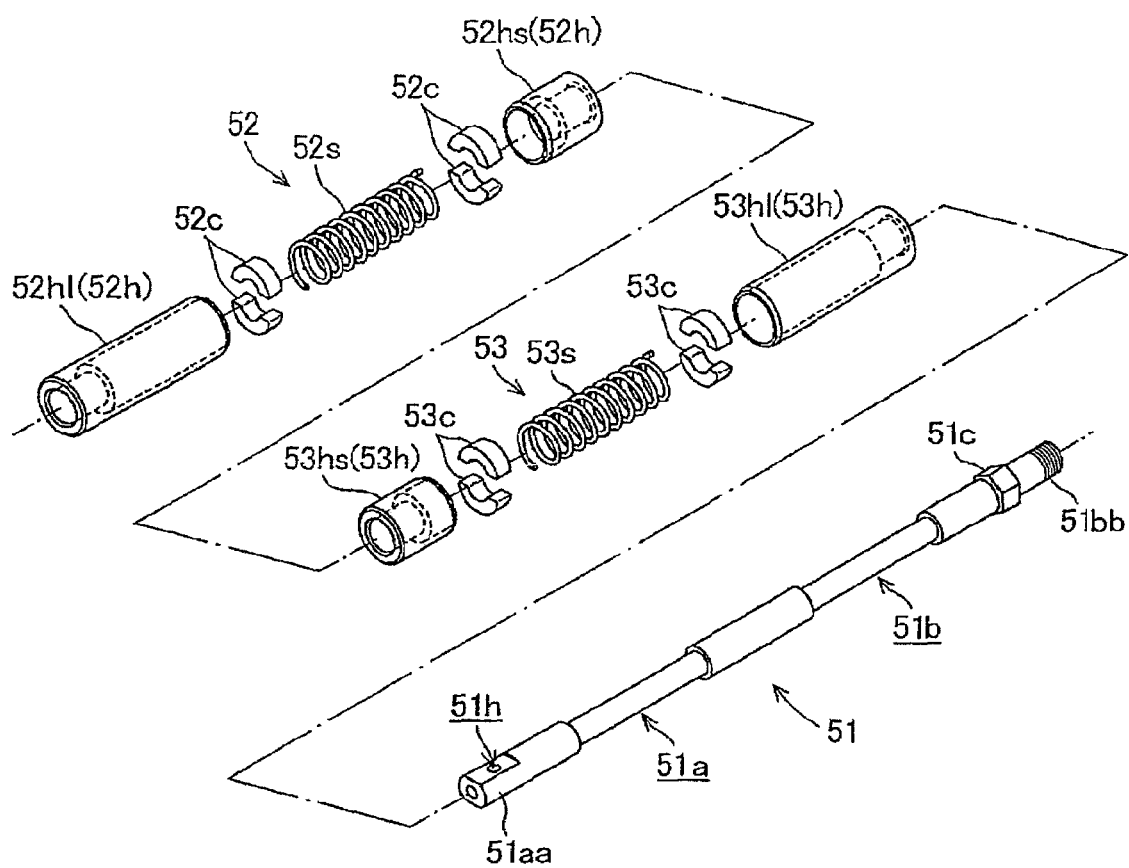
FIG. 6 is an exploded perspective view of a control rod and lost motion mechanisms.

Referring to FIG. 6, the control rod 51 of the shift drive means 50 is formed like a cylindrical rod. In addition, the control rod 51 is formed at two, axially right and light, positions with outer circumferential recessed sections 51a and 51b each reduced in diameter and extending by a given length.

The control rod 51 is formed at a left end with a two-face width-cut end portion 51aa resulting from cutting away circular arc portions by parallel flat surfaces. The two-face width-cut end portion 51aa is bored with a pin hole 51h passing both the flat surfaces.

The control rod 51 is formed at a right end with an external thread end portion 51bb formed with a mail screw. In addition, a hexagonal nut portion 51c is formed in front of the external thread end portion 51bb.

The lost motion mechanisms 52 and 53 are assembled to the left and right outer circumferential recessed sections 51a and 51b, respectively, of the control rod 51.

The left and right lost motion mechanisms 52, 53 have the same configuration and are arranged symmetrically with each other.

The left lost motion mechanism 52 is such that a spring holder 52h is configured by connecting a long holder 52hl with a short holder 52hs so as to receive the control rod 51 slidably fitted thereinto. In addition, the spring holder 52h is formed on an inner circumferential surface with an inner circumferential recessed section 52ha corresponding to the outer circumferential recessed section 51a of the control rod 51.

If the control rod 51 is passed through the spring holder 52h to locate the spring holder 52h at the outer circumferential recessed section 51a, both the spaces of the inner circumferential recessed section 52ha of the spring holder 52h and the outer circumferential recessed section 51a of the control rod 51 form a common space.

A pair of right and left cotters 52c, 52c which are spring receivers are oppositely insertably fitted to straddle both the spaces of the inner circumferential recessed section 52ha of the spring holder 52h and the outer circumferential recessed section 51a of the control rod 51. A compression coil spring 52s wound around the control rod 51 is provided between both the cotters 52c, 52c to bias the cotters 52c, 52c in such a direction as to make them away from each other.

Incidentally, the cotter 52c is formed like a hollow disk having an outer diameter corresponding to the inner diameter of the inner circumferential recessed section 52ha of the spring holder 52h and an inner diameter corresponding to the outer diameter of the outer circumferential section 51a of the control rod 51. In addition, the cotter 52c is half-split for assembly.

Also the right lost motion mechanism 53 (a spring holder 53h, a long holder 53hl, a short holder 53hs, an inner circumferential section 53ha, cotters 53c and a compression coil spring 53s) have the same structure as that of the left lost motion mechanism 52. In addition, the right lost motion mechanism 53 is disposed at the outer circumferential recessed section 51b of the control rod 51.

In this way, the control rod 51 is axially moved to axially move the spring holders 52h and 53h via the compression coil springs 52s and 53s of the left and right lost motion mechanisms 52, 53, respectively.

Figure 7:
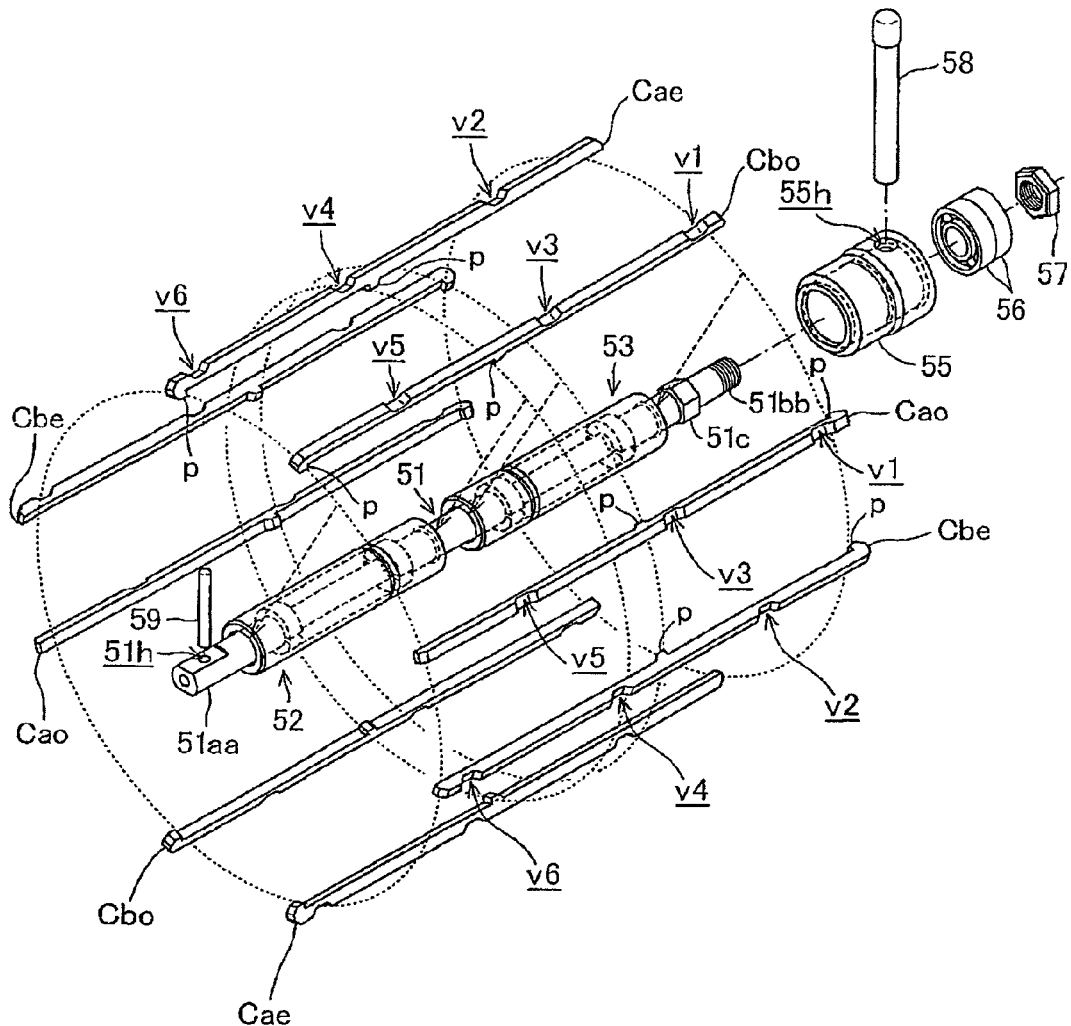
FIG. 7 is an exploded perspective view illustrating a state where the lost motion mechanisms are assembled to the control rod, and the cam rods, etc.

The eight cam rods C (Cao, Cao, Cae, Cae, Cbo, Cbo, Cbe, Cbe) are radially located and abutted against the respective outer circumferential surfaces of the spring holders 52h and 53h of the lost motion mechanisms 52 and 53 attached respectively to the left and right outer circumferential recessed sections 51a, 51b of the control rod 51 (see FIG. 7).

The cam rod C is an axially elongated prismatic bar member rectangular in cross-section. In addition, the cam rod C is formed with a cam face on the outer circumferential lateral surface on the side opposite to the inner circumferential lateral surface in contact with the spring holders 52h and 53h. The cam face is formed with cam grooves v at three desired positions. In addition, a pair of retaining claws p project from the inner circumferential lateral surface so as to retain any one of the spring holders 52h and 53h in such a manner as to grip it from either side thereof.

The cam rod C is not formed in a special shape in cross-section, that is, the cam rod C is a prismatic bar member with a generally simple rectangle outline; therefore, the cam rod C can be manufactured with ease.

The odd-numbered stage cam rods Cao and Cbo each formed with cam grooves v1, v3 and v5 at three positions corresponding, respectively, to the odd-numbered stage gears (the first, third and fifth driving speed-change gears n1, n3 and n5) are of two types. One of the types is for normal rotation (a rotary direction where force is applied from the driven speed-change gear n to the counter gear shaft 12 during acceleration). The other type is for reverse rotation (a rotary direction where force is applied to the counter gear shaft 12 from the driven speed-change gear n to the counter gear shaft 12 during deceleration). The one normal rotation odd-numbered stage cam rods Cao each have a retaining claw p retaining a right spring holder 53h on the inner circumferential lateral surface. The other reverse rotation odd-numbered stage cam rods Cbo each have a retaining claw p retaining the left spring holder 52h on the inner circumferential lateral surface (see FIG. 7).

Similarly, the even-numbered stage cam rods Cae, Cbe each formed with cam grooves v2, v4 and v6 at three positions corresponding, respectively, to the even-numbered stage gears (the second, fourth and sixth driving speed-change gears n2, n4 and n6) are of two types. One of the types is for normal rotation and the other type is for reverse rotation. The one normal rotation even-numbered stage cam rods Cae each have a retaining claw p retaining a left spring holder 52h on the inner circumferential lateral surface. The other reverse rotation even-numbered stage cam rods Cbe each have a retaining claw p retaining the right spring holder 53h on the inner circumferential lateral surface (see FIG. 7).

In this way, the axial movement of the control rod 51 axially simultaneously moves the normal rotation odd-numbered stage cam rods Cao and the reverse rotation even-numbered stage cam rods Cbe along with the spring holder 53h via the compression coil spring 53s of the right lost motion mechanism 53. In addition, the axial movement of the control rod 51 axially simultaneously moves the reverse rotation odd-numbered stage cam rods Cbo and the normal rotation even-numbered stage cam rods Cae along with the spring holder 52h via the coil spring 52s of the left lost motion mechanism 52.

As illustrated in FIG. 7, a cylindrical control rod operating element 55 is attached to an right end portion on the right side of the nut portion 51c of the control rod 51 via a ball bearing 56 fitted into the inside of the operating element 55.

The ball bearing 56 is formed by axially joining together two pieces. The ball bearing 56 is fitted into a right end portion on the right side of the nut portion 51c of the control rod 51, put between the nut portion 51c and a nut 57 threadedly engaged with the external thread portion 51bb and fastened by the nut 57.

In this way, the control rod operating element 55 turnably holds the right end portion of the control rod 51.

A diametrically bored pin hole 55h is formed in a cylindrical portion of the control rod operating element 55 extending rightward from the threadedly engaged nut 57. A shift pin 58 passes through the pin hole 55h.

Incidentally, an engaging pin 59 passes through a pin hole 51h formed at the left end-located two-face width-cut end portion 51aa of the control rod 51.

As illustrated in FIG. 1, the shift pin 58 passed through the control rod operating element 55 has both ends projecting therefrom.

A guide portion 1Ra projects rightward from the sidewall 1RR of the right engine case 1R. The guide portion 1Ra is formed with a groove 60 extending in the left-right direction. A one-end head projecting from the shift pin 58 is slidably fitted to the groove 60 to lock the shift pin 58.

A support shaft 65 is provided on the sidewall 1RR to project rightward therefrom. A shift drum 67 is turnably supported by the support shaft 65 via a bearing 66. The other end projecting portion of the shift pin 58 is slidably fitted to the shift groove 67v of the shift drum 67.

The shift groove 67v of the shift drum 67 is formed on the drum outer circumferential surface so as to draw a spiral along a generally full circle. In addition, the shift groove 67v is formed with the speed-change stage positions from the first through sixth speeds for each given turning angle (e.g. 60 degrees) and with a neutral position in the middle thereof.

In this way, the turning of the shift drum 67 axially moves the shift pin 58 fitted to the shift groove 67v together with the control rod operating element 55.

Since the control rod operating element 55 turnably holds the right end portion of the control rod 51, eventually, the turning of the shift drum 67 axially moves the control rod 51.

This shift drum 67 is turned by manually operating a shift select lever not illustrated via a shift transmitting means (not illustrated).

The shift transmitting means is provided with a mechanism such as a shift cam member adapted to stably hold the shift drum 67 at the speed-change stage positions for each given angle. Thus, the operating force of the shift select lever is transmitted to a gear 67g formed at a lateral edge of the shift drum 67 to sequentially turn the shift drum 67 to the speed-change stage positions.

As described above, the shift drive means 50 is operated as below. The shift drum 67 is turned by the manual operation of the shift select lever. The turning of the shift drum 67 guides and axially moves the shift pin 58 fitted to the shift groove 67v. The movement of the shift pin 58 axially moves the control rod 51 via the control rod operating element 55. The movement of the control rod 51 simultaneously moves the eight cam rods Cao, Cao, Cae, Cae, Cbo, Cbo, Cbe and Cbe of the engaging means 20 via the lost motion mechanisms 52 and 53.

The control rod 51 assembled with the lost motion mechanisms 52 and 53 is inserted into the hollow of the counter gear shaft 12 and arranged at its central axis.

The hollow cylindrical counter gear shaft 12 has an inner diameter generally equal to the outer diameter of each of the respective spring holders 52h and 53h of the lost motion mechanisms 52 and 53. The counter gear shaft 12 is adapted to receive the spring holders 52h and 53h, slidably fitted thereinto, attached to the control rod 51.

Figure 9:
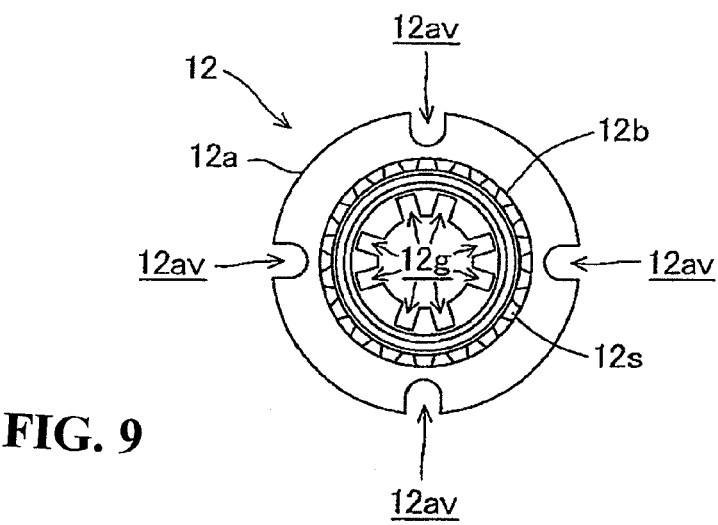
FIG. 9 is a left lateral view (a view as viewed from IX of FIG. 8) of the counter gear shaft.

The counter gear shaft 12 is formed with eight cam guide grooves 12g on the hollow inner circumferential surface at eight radial positions. The cam guide grooves 12g are each formed rectangle in cross-section so as to extend in the axial direction (see FIG. 9).

The eight cam rods Cao, Cao, Cae, Cae, Cbo, Cbo, Cbe and Cbe are slidably fitted to the corresponding cam guide grooves 12g in the arrangement as illustrated in FIG. 7.

The cam rods C of the same kind are arranged at symmetrical positions.

The cam guide groove 12g serving as a locking member of the cam member C relative to the counter gear shaft 12 is simply formed into in a rectangular U-shape in cross-section; therefore, it can easily be shaped.

The depth of the cam guide groove 12g is equal to the radial direction of the cam rod C. Therefore, a cam face, i.e., an outer circumferential lateral surface, of the cam rod C comes into slidable contact with the bottom surface of the cam guide groove 12g. In addition, its inner circumferential lateral surface comes into contact with the outer circumferential surfaces of the spring holders 52h and 53h so as to generally flush with the hollow inner circumferential surface. The retaining claws p projecting from the inner circumferential lateral surface hold any one of the spring holders 52h and 53h from both the sides thereof.

The hollow cylindrical counter gear shaft 12 is formed with a left cylindrical section 12b and a right cylindrical section 12c both reduced in outer diameter on both the sides of, i.e., on the left and right sides, respectively, of a central cylindrical section 12a. The central cylindrical section 12a rotatably supports the driven speed-change gears n via the bearing collar members 13 (see FIG. 8).

Figure 2:
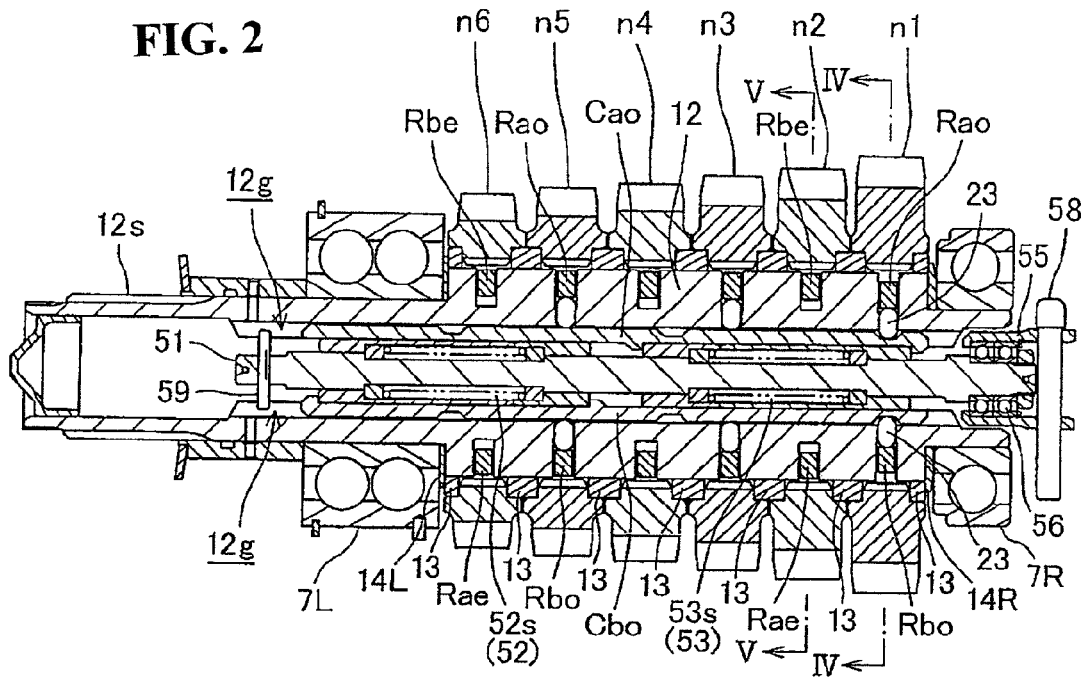
FIG. 2 is a cross-sectional view illustrating a counter gear shaft and its peripheral structure (a cross-sectional view taken along line II-II of FIGS. 4 and 5)
Figure 3:
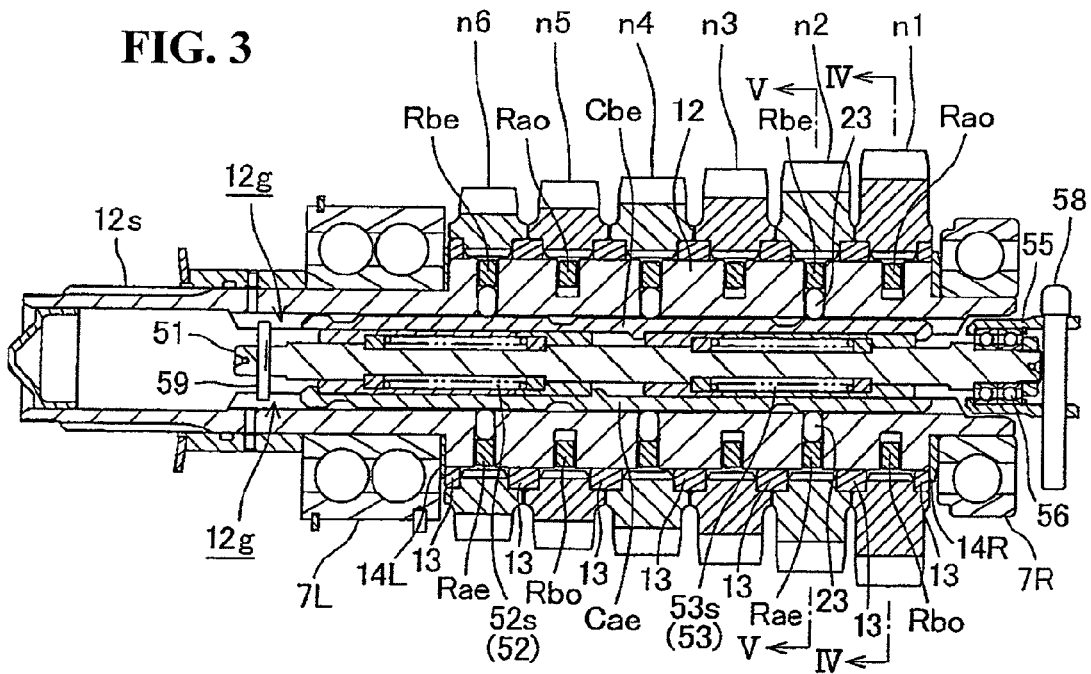
FIG. 3 is another cross-sectional view illustrating the counter gear shaft and its peripheral structure (a cross-sectional view taken along line III-III of FIGS. 4 and 5)

The bearing 7L is fitted to the left cylindrical section 12b via the collar member 14L. In addition, a partial spline 12s is formed on the left cylindrical section 12b and adapted to receive the output sprocket (not illustrated) spline-fitted thereto. On the other hand, the bearing 7R is fitted to the right cylindrical section 12c via the collar member 14R (see FIGS. 1, 2 and 3).

The hollow of the counter gear shaft 12 is internally formed with a small-diameter circumferential surface and a large-diameter inner circumferential surface. The small-diameter inner circumferential surface is formed with the cam guide grooves 12g and has an inner diameter equal to the outer diameter of the spring holders 52h and 53h. The large-diameter inner circumferential surface is such that the inner diameter on both sides of the small-diameter inner circumferential surface is almost flush with the bottom surface of the cam guide grooves 12g (see FIGS. 2 and 3).

The control rod operating element 55 is generally half inserted into the inside of the right enlarged inner diameter section.

The engaging pin 59 passing through the pin hole 51h formed in the two-face width-cut end portion 51aa on the left end of the control rod 51 is engaged at both ends with the cam guide grooves 12g, 12g located at symmetrical positions for serving as a locking member. Thus, the control rod 51 is restricted from relative rotation and rotated integrally with the counter gear shaft 12 while enabling axial movement relative thereto.

The simple configuration where the cam guide grooves 12g are used to engage the engaging pin 59 can lock the control rod 51 relative to the counter gear shaft 12.

As described above, the control rod 51, the lost motion mechanisms 52 and 53, and the eight cam rods Cao, Cao, Cae, Cae, Cbo, Cbo, Cbe and Cbe are assembled into the hollow of the counter gear shaft 12. All of them are rotated together. If the control rod 51 is axially moved, the reverse rotation odd-numbered stage cam rods Cbo and the normal rotation even-numbered stage cam rods Cae are simultaneously axially moved via the coil spring 52s of the left lost motion mechanism 52. In addition, the normal rotation odd-numbered stage cam rods Cao and the reverse rotation even-numbered stage cam rods Cbe are simultaneously axially moved via the coil spring 53s of the right lost motion mechanism 53.

The lost motion mechanisms 52 and 53 are aligned with each other in the axial direction of the counter gear shaft 12 and interposed between the outer circumferential surface of the control rod 51 and the inner surfaces of the cam rods C. In this way, in the hollow of the counter gear shaft 12, the control rod 51, the lost motion mechanisms 52 and 53, and the cam rods C are configured to radially overlap one another to avoid the axial enlargement of the multistage transmission 10. In addition, the lost motion mechanisms 52 and 53 can compactly be housed in the hollow of the counter gear shaft 12 to downsize the multistage transmission 10 per se.

Two of the lost motion mechanisms 52 and 53 are axially provided on the control rod 51 and simultaneously move the corresponding different cam rods C. Thus, the movement of the single control rod 51 allows the plurality of cam rods C to perform two kinds of respective different motions, thereby enabling smooth shifting. In addition, the lost motion mechanisms 52 and 53 are symmetrically configured to suppress manufacturing cost and facilitate parts management during assembly The lost motion mechanism 52 is configured such that the coil spring 52s is disposed in the space defined between the inner circumferential recessed portion 52ha of the spring holder 52h interposed between the outer circumferential surface of the control rod 51 and the inner surfaces of the cam rods C, and the outer circumferential recessed section 51a of the control rod 51. Similarly, the lost motion mechanism 53 is configured such that the coil spring 53s is disposed in the space defined between the inner circumferential recessed portion 53ha of the spring holder 53h interposed between the outer circumferential surface of the control rod 51 and the inner surfaces of the cam rods C, and the outer circumferential recessed section 51b of the control rod 51. Thus, the lost motion mechanisms 52 and 53 having the same shape can be configured on the control rod 51.

Figure 8:
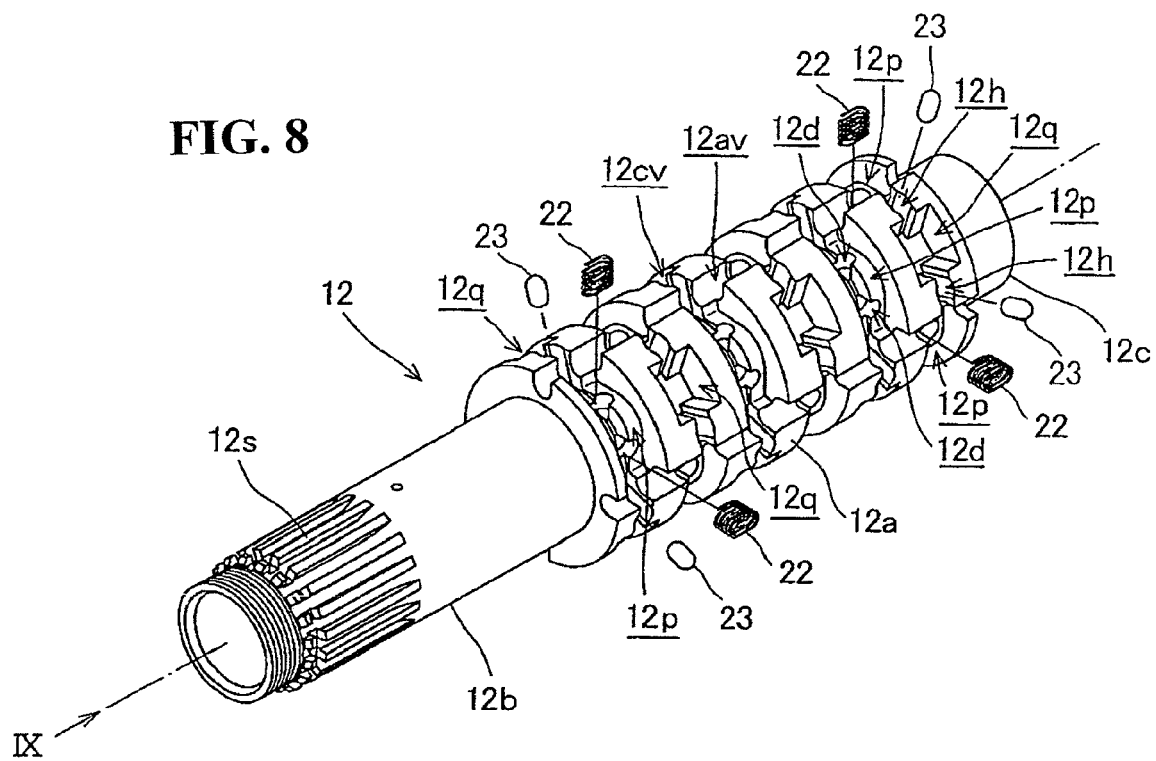
FIG. 8 is a partial exploded perspective view of the counter gear shaft, pin members and springs.

As illustrated in FIG. 8, the central cylindrical section 12a rotatably supporting the driven speed-change gears n via the bearing collar members 13 of the counter gear shaft 12 is formed to have a large diameter and a large thickness. In the central cylindrical section 12a, six narrow circumferential grooves 12cv circumferentially fully circling this thick outer circumferential portion are formed at axially equal intervals so as to correspond to the first, second, third, fourth, fifth and sixth driven speed-change gears n1, n2, n3, n4, n5 and n6. In addition, four axially extending grooves 12av are circumferentially formed at equal intervals.

Further, the outer circumferential portion of the central cylindrical section 12a of the counter gear shaft 12 is sectioned by the four axial grooves 12av into four sections. Each of the four sections is axially alternately formed with a long rectangular recessed portion 12p and a short rectangular recessed portion 12q. The long rectangular recessed portion 12p is such that the groove width of the circumferential groove 12cv is right-left-equally enlarged along the distance between the adjacent axial grooves 12av in each circumferential groove 12cv. The short rectangular recessed portion 12q is such that the groove width of the circumferential groove 12cv is right-left-equally enlarged along part of the distance between the adjacent axial grooves 12av in each circumferential groove 12cv.

Slightly recessed spring-receiving portions 12d, 12d are formed in the bottom of the long rectangular recessed portion 12p at two positions spaced circumferentially from each other so as to have an axially long oval figure and extend along the circumferential groove 12cv.

Pin holes 12h are each bored in a thick-walled portion between the short rectangular recessed portion 12q and the axial groove 12av and on the circumferential groove 12cv so as to finish at the cam guide groove 12g.

Specifically, the pin holes 12h are bored in the radial direction of the cam guide grooves 12g carved at eight circumferential positions from the hollow inner circumferential surface of the counter gear shaft 12.

The pin holes 12h are formed on each circumferential groove 12cv at four positions.

The elliptically wound compression spring 22 is fitted at its end portion into the spring-receiving portion 12d.

A pin member 23 is slidably fitted into the pin hole 12h.

Incidentally, the width of the cam guide groove 12g communicating with the pin hole 12h is smaller than the outer-diametric width of the pin member 23.

Therefore, the advancing and retracting pin member 23 will not fall off into the cam guide groove 12g, which facilitates assembly of the engaging means 20 to the counter gear shaft 12.

The cam rod C is slidably fitted to the cam guide groove 12g. Therefore, the pin member 23 fitted into the pin hole 12h comes into contact with the cam face of a corresponding cam rod C at its central side end portion. If the movement of the cam rod C allows the cam groove v to face the pin hole 12h, then the pin member 23 drops into the cam groove v. If movement of the cam rod C allows the cam groove v to be aligned with a slidable contact surface other than the cam groove v, the pin member 23 is allowed to go on the slidable contact surface and to be advanced and retracted by the movement of the cam rod C.

The advancement and retraction of the pin member 23 in the pin hole 12h allows its centrifugal side end portion to project and recede from the bottom surface of the circumferential groove 12cv.

A swing claw member R is buried in the long rectangular recessed section 12p, the short rectangular recessed section 12q and the circumferential groove 12cv establishing communicative connection between both the recessed sections formed on the outer circumferential portion of the central cylindrical section 12a of the counter gear shaft 12 configured as above. Spindle pins 26 are buried in each of the axial grooves 12av to pivotally support corresponding swing claw members R.

Figure 11:
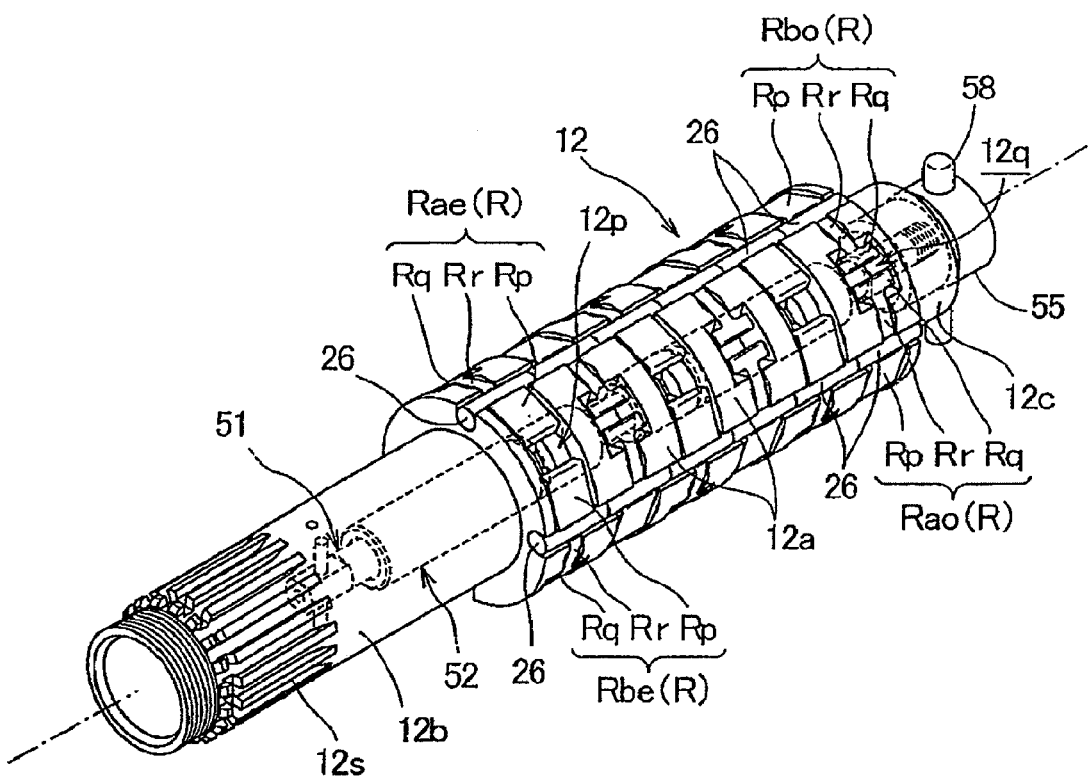
FIG. 11 is a perspective view illustrating a state where a portion of shift drive means and engaging means are assembled to the control rod.

FIG. 11 illustrates a state where all the swing claw members R are assembled as described above.

Figure 10:
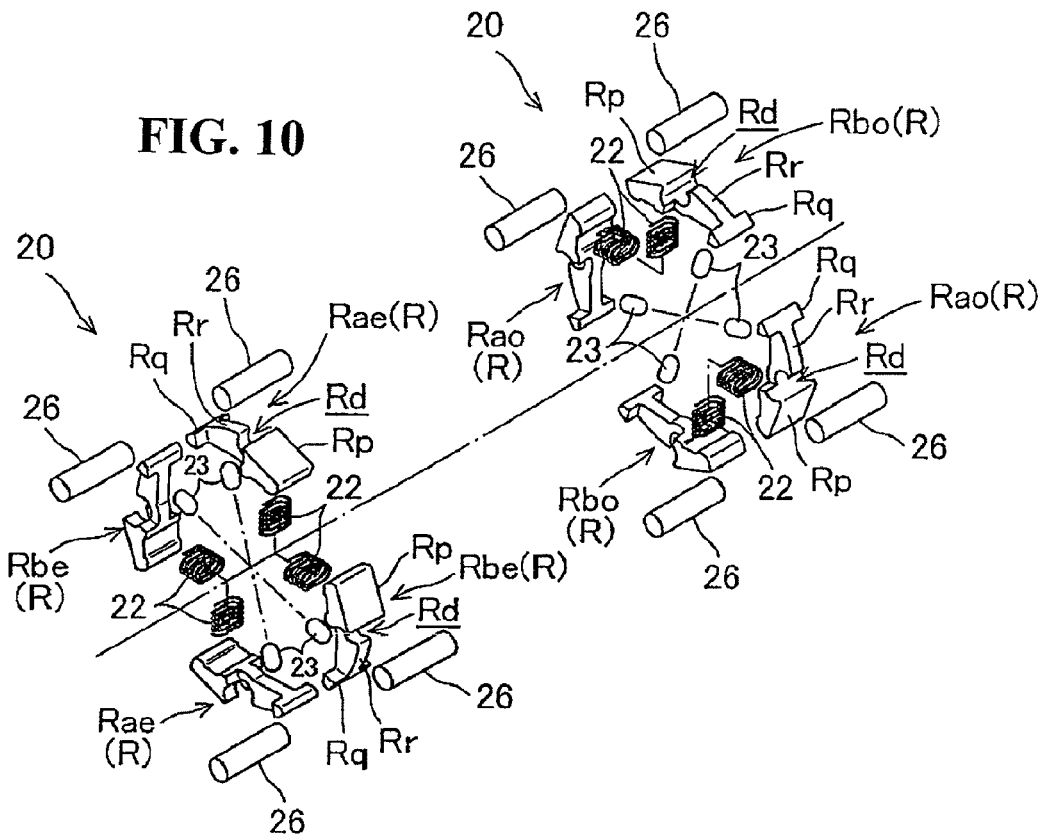
FIG. 10 is an exploded perspective view of swing claw members, spindle pins, the pin members and springs.

An exploded perspective view of FIG. 10 illustrates one set of four swing claw members R and the other set of four swing claw members R with their postures maintaining relative-angle position relationship therebetween. The one set of four swing claw members R are buried in the circumferential groove 12cv, the long rectangular recessed section 12p and the short rectangular recessed section 12q corresponding to the odd-numbered stage gears (the first, third and fifth driven speed-change gears n1, n3 and n5). The other set of four swing claw members R are buried in the circumferential groove 12cv, the long rectangular recessed section 12p and the short rectangular recessed section 12q corresponding to the even-numbered stage gears (the second, fourth and sixth driven speed-change gears n2, n4 and n6). In addition, this view illustrates the spindle pins 26 supporting the swing claw members R and the compression springs 22 acting on the swing claw members R, and the pin members 23.

All of the swing claw members R used have the same shape, which is formed in a generally circular arc shape as viewed in the axial direction. The swing claw member R is formed with a bearing recessed portion Rd, a wide rectangular engaging claw portion Rp, a narrow pin-receiving portion Rr and a wide end portion Rq. The bearing recessed portion Rd is formed by cutting away an outer circumferential portion of a through hole adapted to receive the spindle pin 26 centrally passed therethrough. The wide rectangular engaging claw portion Rp is formed on one side of the swing center of the bearing recessed portion Rd so as to be swingably fitted into the long rectangular recessed portion 12p. The narrow pin-receiving portion Pr extends toward the other side of the swing center of the bearing recessed portion Rd and is swingably fitted into the circumferential groove 12cv formed with the pin hole 12h. The wide end portion Rq is formed at an end of the narrow pin-receiving portion Rr so as to reach the short rectangular recessed portion 12q and extend widthwise.

The swing claw member R is such that the pin-receiving portion Rr is fitted into the circumferential groove 12cv formed with the pin holes 12h. The engaging claw portion Rp on the one side is fitted into the long rectangular recessed portion 12p and the bearing recessed portion Rd is aligned with the axial groove 12av. The wide end portion Rq on the other side is fitted into the short rectangular recessed portion 12q.

The spindle pin 26 is fitted into the bearing recessed portion Rd and the axial groove 12av aligned with each other.

The swing claw member R is formed symmetrical with respect to the circumferential groove 12cv to be fitted thereinto. The wide rectangular claw portion Rp on the one side is heavier than the pin-receiving portion Rr and the wide end portion Rq on the other side. If the swing claw member R is pivotally supported by the spindle pin 26 and rotated together with the counter gear shaft 12, the engaging claw portion Rp acts as a weight with respect to the centrifugal force to swing the swing claw member R while allowing it to project in the centrifugal direction.

The swing claw member R is formed such that the pin-receiving portion Rr has a width smaller than that of the engaging claw portion Rp on the side opposite to the side of the pin-receiving portion Rr with respect to the swing center.

Since the pin-receiving portion Rr needs only to have a width enough to receive the pin member 23, the swing claw member R can be formed small and the engaging claw portion Rp on the other side can easily be swung by a centrifugal force.

The swing claw members R circumferentially adjacent to each other are assembled to the counter gear shaft 12 in a symmetrical posture. Therefore, the engaging claw portions Rp, Rp opposed to each other at a given interval are fitted into the common long rectangle recessed portion 12. In addition, the wide end portions Rq close to each other on the other side are fitted to the common short rectangular recessed portion 12q.

The compression spring 22 whose one end is supported by the spring-receiving portion 12d of the counter gear shaft 12 is provided inside the engaging claw portion Rp of the swing claw member R. The pin member 23 fitted into the pin hole 12h is provided inside the pin-receiving portion Rr and between the pin-receiving portion Rr and the cam rod C.

In this way, the swing claw member R is swingably supported by the spindle pin 26 and buried in the long rectangular recessed portion 12p, short rectangular recessed portion 12q and circumferential groove 12cv of the counter gear shaft 12.

The engaging claw portion Rp on the one side is externally biased by the compression spring 22 and the pin-receiving portion Rr on the other side is pressed by the advancement and retraction of the pin member 23. Thus, the swing claw member R is swung against the biasing force of the compression spring 22.

When the pin member 23 advances in the centrifugal direction to swing the swing claw member R, the engaging claw portion Rp of the swing claw member R sinks in the long rectangular recessed portion 12p. That is to say, nothing externally projects from the outer circumferential surface of the central cylindrical portion 12a of the counter gear shaft 12.

When the pin member 23 retracts, the engaging claw portion Rp biased by the compression spring 22 projects outwardly from the outer circumferential surface of the central cylindrical section 12a of the counter gear shaft 12 and is able to engage the driven speed-change gear n.

The compression spring 22 is interposed between the inner surface of the engaging claw portion Rp of the swing claw member R and the long rectangular recessed portion, of the counter gear shaft 12, opposed to the inner surface of the engaging claw portion Rp. This eliminates a spring-specific axial space so that the axial enlargement of the counter gear shaft 12 can be avoided. In addition, the compression spring 22 is disposed at the axially widthwise center of the swing claw member R so that the swing claw member R per se can be formed symmetric with respect to the axial direction. Therefore, two kinds of swing claw members engaged and disengaged in both directions of relative rotational directions of the driven speed-change gear n and the counter gear shaft 12 can be taken as the swing claw members R having the same shape. Thus, it is not necessary to prepare swing claw members different in shape from each other.

The compression spring 22 is formed in an oval figure with a major axis extending in the axial direction of the counter gear shaft 12. This oval-shaped compression spring 22 has the oval axis greater than the width of the pin-receiving portion Rr of the sing claw member R. In addition, the compression spring 22 is received to straddle the circumferential groove 12cv formed to circumferentially extend around one circle and receive the pin-receiving portion Rr swingably fitted thereto. Thus, the machining of the counter gear shaft 12 can be facilitated and the swing claw member R can stably be assembled to the counter gear shaft 12.

The four swing claw member R corresponding to the odd-numbered stage gears (the first, third and fifth driven speed-change gears n1, n3 and n5) and the four swing claw member R corresponding to the even-numbered stage gears (the second, fourth and sixth driven speed-change gears n2, n4 and n6) are in relative-angle positional relationship where they are turned 90 degrees around the axis with each other.

The four swing claw members R corresponding to the odd-numbered stage gears (the first, third and fifth driven speed-change gears n1, n3 and n5) are composed of a pair of normal rotation odd-numbered stage swing claw members Rao arranged at respective symmetrical positions and a pair of reverse rotation odd-numbered stage engaging members Rbo arranged at respective symmetrical positions. The normal rotation odd-numbered stage driven swing claw members Rao are abutted in the normal-rotational direction of gears to establish engagement to synchronously rotate each of the odd-numbered stage driven speed-change gears n1, n3 and n5 and the counter gear shaft 12. The reverse rotation odd-numbered stage engaging members Rbo are abutted in the reverse-rotational direction of gears to establish engagement to synchronously rotate each of the odd-numbered stage driven speed-change gears n1, n3 and n5 and the counter gear shaft 12.

Similarly, the four swing claw members R corresponding to the even-numbered stage gears (the second, fourth and sixth driven speed-change gears n2, n4 and n6) are composed of a pair of normal rotation even-numbered stage swing claw members Rae arranged at respective symmetrical positions and a pair of reverse rotation even-numbered stage engaging members Rbe arranged at respective symmetrical positions. The normal rotation even-numbered stage driven swing claw members Rae are abutted in the normal-rotational direction of gears to establish engagement to synchronously rotate each of the even-numbered stage driven speed-change gears n2, n4, n6 and the counter gear shaft 12. The reverse rotation even-numbered stage engaging members Rbe are abutted in the reverse-rotational direction of gears to establish engagement to synchronously rotate each of the even-numbered stage driven speed-change gears n2, n4, n6 and the counter gear shaft 12.

The normal rotation odd-numbered stage swing claw member Rao is swung by the pin member 23 advanced and retracted by the movement of the normal rotation odd-numbered stage cam rod Cao. The reverse rotation odd-numbered stage engaging member Rbo is swung by the pin member 23 advanced and retracted by the movement of the reverse rotation odd-numbered stage cam rod Cbo.

Similarly, the normal rotation even-numbered stage swing claw member Rae is swung by the pin member 23 advanced and retracted by the movement of the normal rotation even-numbered stage cam rod Cae. The reverse rotation even-numbered stage engaging member Rbe is swung by the pin member 23 advanced and retracted by the movement of the reverse rotation even-numbered stage cam rod Cbe.

When the engaging means 20 are assembled to the counter gear shaft 12, first, the right end bearing collar member 13 is externally provided on the outer circumferential end portion of the central cylindrical section 12a. While one end of the spindle pin 26 is fitted into the axial groove 12av inside the bearing collar member 13, the right end engaging means 20 is assembled. The next bearing collar member 13 is externally provided to cover the other end of the spindle pin 26. Thereafter, the next stage engaging means 20 is assembled in the same manner as the previous stage. Such assembly is repeated and lastly the left end bearing collar member 13 is externally provided. Thus, the assembly is completed.

Figure 12:
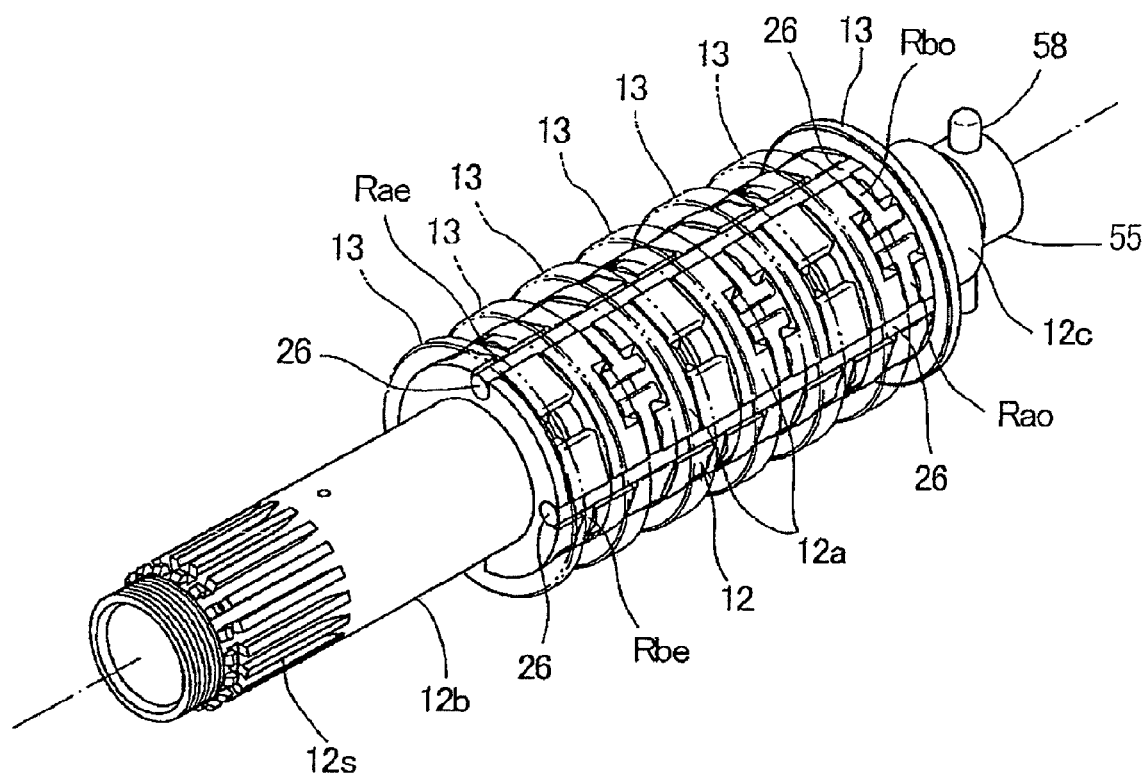
FIG. 12 is a perspective view illustrating a state where a bearing collar member is externally provided on the counter gear shaft of the state illustrated in FIG. 11.

As illustrated in FIG. 12, the bearing collar members 13 are externally provided at the axial positions of the central cylindrical portion 12a other than the long rectangular recessed portion 12p and the short rectangular recessed portion 12q. In addition, the bearing color members 13 are arranged to straddle adjacent spindle pins 26, 26 of the spindle pins 26 buried continuously in line in the corresponding axial grooves 26av. Thus, the spindle pins 26 and the swing claw members R are prevented from falling off.

The spindle pin 26 buried in the axial groove 12av of the central cylindrical section 12a of the counter gear shaft 12 is buried at a depth in contact with the outer circumferential surface of the central cylindrical portion 12a. Therefore, if externally provided, the bearing collar members 13 are secured without loose.

The seven bearing collar members 13 are externally provided on the counter gear shaft 12 at regular intervals and the driven speed-change gears n are rotatably supported so as to each straddle between the adjacent bearing collar members 13, 13.

Each of the driven speed-change gears n is formed with notches at right and left inner circumferential edge portions (the right and left circumferential edge portions of the inner circumferential surface). In addition, an annular thin projecting ridge 30 is formed between the right and left notches. The right and left collar members 13, 13 are slidably engaged with the corresponding notches so as to put the projecting ridge 30 therebetween (see FIGS. 2 and 3).

Engaging projections 31 are formed on the projecting ridge 30 of the inner circumferential surface of each driven speed-change gear n at six positions with circumferentially regular intervals (see FIGS. 2, 3, 4 and 5).

The engaging projection 31 is formed like a thin circular arc as viewed in side elevation (as viewed from the axial direction in FIGS. 4 and 5). Both circumferential end faces of the engaging projection 31 are engaging faces each engaging the engaging claw portion Rp of the swing claw member R.

The normal rotation odd-numbered stage swing claw member Rao (the normal rotation even-numbered stage swing claw member Rae) and the reverse rotation odd-numbered stage engaging member Rbo (the reverse rotation even-numbered stage engaging member Rbe) have the respective engaging claw portions Rp, Rp extending in directions opposed to each other. The normal rotation odd-numbered stage swing claw member Rao (the normal rotation even-numbered stage swing claw member Rae) is abutted against and engaged with the engaging projection 31 in the normal rotation direction of the driven speed-change gear n (and of the counter gear shaft 12). The reverse rotation odd-numbered stage engaging member Rbo (the reverse rotation even-numbered stage engaging member Rbe) is abutted against and engaged with the engaging projection 31 in the reverse rotation direction of the driven speed-change gear n.

Incidentally, the normal rotation odd-numbered stage swing claw member Rao (the normal rotation even-numbered stage swing claw member Rae) is not engaged with the engaging projection 31 in the reverse rotation direction of the driven speed-change gear n even if the engaging claw portion Rp projects outwardly. Similarly, the reverse rotation odd-numbered stage engaging member Rbo (the reverse rotation even-numbered stage engaging member Rbe) is not engaged with the engaging projection 31 in the normal rotation direction of the driven speed-change gear n even if the engaging claw portion Rp projects outwardly.

A description is given of a procedure for assembling the above-described engaging means 20 to the counter gear shaft 12.

The two left and right lost motion mechanisms 52, 53 are assembled to the control rod 51 attached with the control rod operating element 55 and with the engaging pin 59. The eight cam rods Cao, Cao, Cae, Cae, Cbo, Cbo, Cbe and Cbe are arranged on the outer circumference of the lost motion mechanisms 52 and 53. In this state, these are insertably fitted into the hollow of the counter gear shaft 12.

In this case, the eight cam rods Cao, Cao, Cae, Cae, Cbo, Cbo, Cbe and Cbe are each inserted into a corresponding one of the eight cam guide grooves 12g.

In addition, the right-left movement position of the eight cam rods Cao, Cao, Cae, Cae, Cbo, Cbo, Cbe and Cbe with respect to the counter gear shaft 12 is set to a neutral position.

The counter gear shaft 12 in this state is raised upright with the left up.

As illustrated with solid lines in FIG. 12, first, the right end collar member 13 is externally provided at the lower end (the right end) of the central cylindrical section 12a. Then, the pin members 23 are inserted into the pin holes 12h of the circumferential groove 12cv corresponding to the lowest first driven speed-change gear n1. While one ends of the compression springs 22 are supported by the spring-receiving portions 12d, the swing claw members R are fitted into the long rectangular recessed portions 12p, the short rectangular recessed portions 12q and the circumferential groove 12cv. The spindle pins 26 are fitted into the axial grooves 12av inside the right end bearing collar member 13. At the same time, the spindle pins 26 are fitted into the bearing recessed portions Rd of the swing claw members R for assembling the swing claw member R.

When the cam rod C is located at the neutral position, the pin members 23 come into contact with and advance along the slidable contact surface other than the cam grooves and presses from the inside the pin-receiving portions Rq of the swing claw members R for swing against the biasing force of the compression springs 22. This allows the engaging claw portions Rp to sink into the long recessed portions 12p. Thus, nothing projects outwardly from the outer circumferential surface of the central cylindrical section 12a.

The four swing claw members R in the circumferential groove 12cv corresponding to the first driven speed-change gear n1 are assembled. Thereafter, the first driven speed-change gear n1 is insertably fitted from above so as to bring the projecting ridges 30 of the first driven speed-change gear n1 into abutment against the bearing collar member 13 and into engagement with the notches for assembly. Next, the second bearing collar member 13 is insertably fitted from above so as to be engaged with the notches of the first driven speed-change gear n1 and externally provided on the counter gear shaft 12 at a given position. Thus, the first driven speed-change gear n1 is axially positioned for attachment.

Next, the engaging means 20 for the second driven speed-change gear n2 is assembled and the second driven speed-change gear n2 are assembled. Thereafter, this work is repeated to sequentially assemble the remaining third, fourth, fifth and sixth driven speed-change gears n3, n4, n5 and n6. Lastly, the seventh bearing collar member 13 is externally provided.

In the state where the six driven speed-change gears n are assembled to the counter gear shaft 12 as described above, the counter gear shaft 12 is rotatably supported by the left and right bearings 7L, 7R fitted respectively to the left engine case 1L and the sidewall 1RR of the right engine case 1R so as to be put between the collar members 14L and 14R. Thus, the six driven speed-change gears n and the seven bearing collar members 13 are alternately assembled and are gripped from the right and left so as to be axially positioned.

The bearing collar members 13 can carry the axial force of the driven speed-change gears n, perform the axial positioning thereof and receive the thrust force thereof.

In this way, the first, second, third, fourth, fifth and sixth driven speed-change gears n1, n2, n3, n4, n5 and n6 can rotatably be supported by the counter gear shaft 12 via the bearing collar members 13.

Since the cam rods C are each located at the neutral position, all the driven speed-change gears n are in the disengagement state where the movement position of the cam rods C of the corresponding engaging means 20 allows the pin members 23 to project and press from the inside the pin-receiving portions Rq of the swing claw members R, thereby inwardly retracting the engaging claw portions Rp. In this state, all the driven speed-change gears n are rotated freely from the counter gear shaft 12.

On the other hand, the driven speed-change gear n may be in the engageable state where the movement position, other than the neutral position, of the cam rods C of the engaging means 20 allows the pin members 23 to go into the cam grooves v and swing the swing claw members R, thereby allowing the engaging claw portions Rp to project outwardly. In such a case, the engaging projections 31 of the corresponding driven speed-change gear n come into abutment against the engaging claw portions Rp. Thus, the rotation of the driven speed-change gear n is transmitted to the counter gear shaft 12 or the rotation of the counter gear shaft 12 is transmitted to the driven speed-change gear n.

In the shift drive means 50, the shift select lever is manually operated to turn the shift drum 67 by a given amount. The turning of the shift drum 67 axially move the control rod 51 by a given amount via the shift pin 58 fitted to the shift groove 67v to move the eight cam rods Cao, Cao, Cae, Cae, Cbo, Cbo, Cbe and Cbe of the engaging means 20 via the lost motion mechanisms 52 and 53.

The axial movement of the cam rods C allows the pin members 23 in slidable contact with the cam surface of the cam rods C to advance and retract while going into and coming out from the cam grooves v to swing the swing claw members R. The swing of the swing claw member R releases the engagement with a driven speed-change gear n and establishes engagement with another driven speed-change gear n, thereby changing the driven speed-change gear n engaged with the counter gear shaft 12 for shifting.

Incidentally, as the shift drive means, the shift select lever is manually operated to turn the shift drum 67 for shifting; however, a shift drive motor may be driven to turn the shift drum via a Geneva stop, etc., for shifting.

A description is hereinafter given of a process for upshift from a first-speed state to a second-speed state reduced in reduction ratio by one stage during acceleration resulting from the drive of the internal combustion engine with reference to FIGS. 13 to 17.

FIGS. 13 to 17(a)-(d) illustrate sequentially temporal changes. In each drawing, FIGS. 13 to 17(a) are cross-sectional views in which the gears, etc. of FIG. 2 (the cross-sectional view taken along line II-II of FIGS. 4 and 5) are omitted. FIGS. 13 to 17(b) are cross-sectional views in which the gears, etc. of FIG. 3 (the cross-sectional view taken along line III-III of FIGS. 4 and 5) are omitted. FIGS. 13 to 17(c) are cross-sectional views taken along line c-c of FIGS. 13 to 17(a) and (b) (the cross-sectional views of the first driven speed-change gear n1). FIGS. 13 to 17(d) are cross-sectional views taken along line d-d of FIGS. 13 to 17(a) and FIGS. 13 to 17(b) (the cross-sectional views of the first driven speed-change gear n2).

The power of the internal combustion engine is transmitted to the main gear shaft 11 via the friction clutch 5 to integrally rotate the first, second, third, fourth, fifth and sixth drive speed-change gears m1, m2, m3, m4, m5 and m6. Thus, the first, second, third, fourth, fifth and sixth driven speed-change gears n1, n2, n3, n4, n5 and n6 constantly meshing with the drive speed-change gears m1 to m6, respectively, are rotated at respective rotation speeds.

FIGS. 13(a)-(d) illustrate the first-speed state. In FIG. 13(c), the first driven speed-change gear n1 is rotated in an arrow direction. In FIG. 13(d), the second driven speed-change gear n2 is rotated in an arrow direction. The second driven speed-change gear n2 is rotated at higher speed than the first driven speed-change gear n1.

Only the pin members 23 of the engaging means 20 corresponding to the first driven speed-change gear n1 are put in the cam grooves v1 of the normal rotation odd-numbered stage cam rod Cao (see FIG. 13(a)). The normal rotation odd-numbered swing claw members Rao of the engaging means 20 allow the engaging claw portions Rp to project outwardly. The engaging projections 31 of the rotating first driven speed-change gear n1 come into engagement with the engaging claw portions Rp of the normal rotation odd-numbered swing claw members Rao (see FIG. 13(c)). Thus, the counter gear shaft 12 is rotated together with the first driven speed-change gear n1 at the same rotation speed as that of the first driven speed-change gear n1.

Incidentally, in FIGS. 13 to 20(a)-(d), the swing claw member R and the engaging projection 31 that provide effective power transmission are lattice-hatched.

In this first-speed state, for the second driven speed-change gear n2, the pin members 23 of the corresponding engaging means 20 come out of the cam grooves v2 of the even-numbered stage cam rods Cae, Cbe (see FIG. 13(b)) to allow the even-numbered swing claw members Rae, Rbe of the engaging means 20 to retract the engaging claw portions Rp inwardly. Thus, the second driven speed-change gear n2 runs idle.

Similarly, also the other, i.e., the third, fourth, fifth and sixth driven speed-change gears n3, n4, n5 and n6 run idle (see FIGS. 13(a) and (b)).

Now, the shift select lever is manually operated to upshift to the second-speed. The shift drum 67 is turned to begin to move the control rod 51 axially rightward, which simultaneously moves the eight cam rods Cao, Cao, Cae, Cae, Cbo, Cbo, Cbe and Cbe in the axially rightward via the coil springs 52s and 53s of the lost motion mechanisms 52 and 53.

Figure 14A:
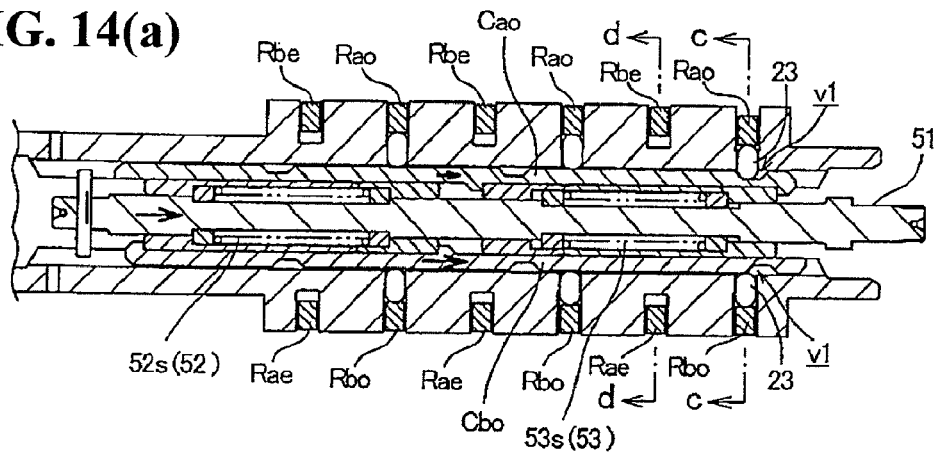
FIGS. 14($a$)-($d$) include explanatory views illustrating one process in the middle of upshift operation.

With reference to FIGS. 14(a) and (c), the reverse rotation odd-numbered stage swing claw members Rbo operated via the pin members 23 do not engage with the engaging projections 31 of the first driven speed-change gear n1. Therefore, the reverse rotation odd-numbered stage cam rods Cbo on one side are moved without much resistance to allow the pin members 23 put in the cam grooves v1 to come out therefrom for projection (see FIG. 14(a)). These projections of the pin members 23 swing the reverse rotation odd-numbered stage swing claw members Rbo to retract the engaging claw portions inwardly (see FIG. 14(c)).

In contrast, the normal rotation odd-numbered swing claw members Rao operated via the pin members 23 come into engagement with the engaging projections 31 of the first driven speed-change gear n1 to receive power from the first driven speed-change gear n1. Therefore, the normal rotation odd-numbered cam rods Cao on the other side receive such significantly large friction resistance for swinging the normal rotation odd-numbered stage swing claw members Rao to disengage. Even if the normal rotation odd-numbered stage cam rod Cao is tried to be moved by the force of the coil spring 53s of the lost motion mechanism 53 to allow the pin members 23 to project along the inclined lateral surfaces of the cam grooves V1, the normal rotation odd-numbered stage swing claw members Rao cannot be lifted for swing. Specifically, the normal rotation odd-numbered cam rods Cao are stopped when the pin members 23 are about to ride on the inclined lateral surfaces of the cam grooves v1. That is to say, the engagement cannot be released unchanged (see (a) and (c) of FIG. 14).

Figure 14B:
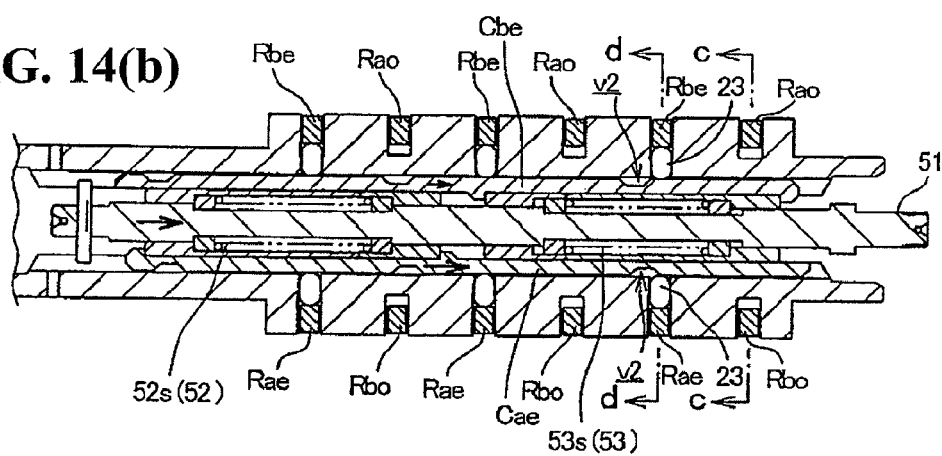
Figure 14C:
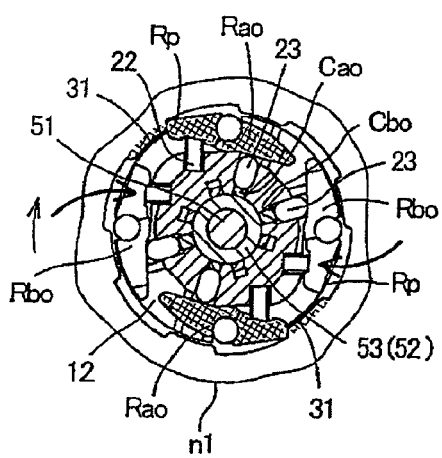
Figure 14D:
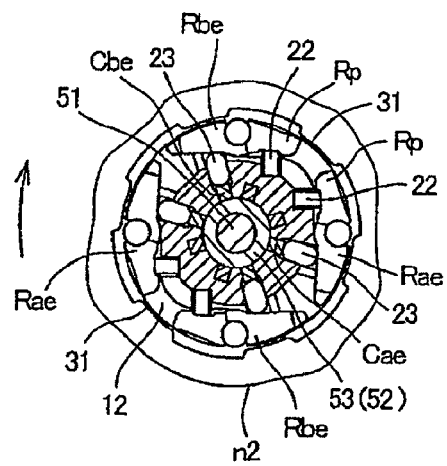
Figure 20A:
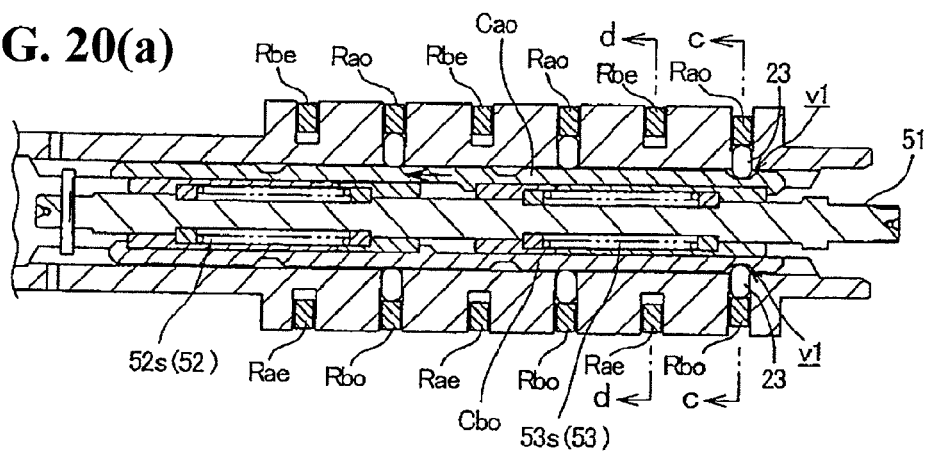
FIGS. 20($a$)-($d$) include explanatory views illustrating the first-speed state at the time of completing the downshift.
Figure 20B:
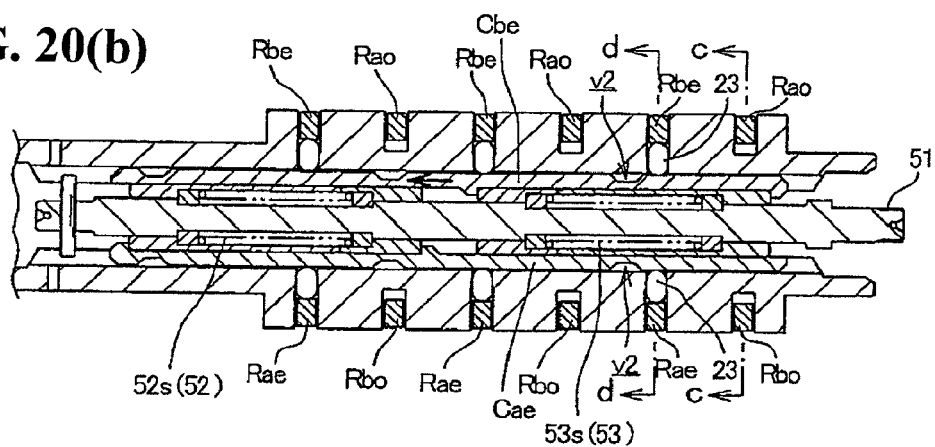
Figure 20C:
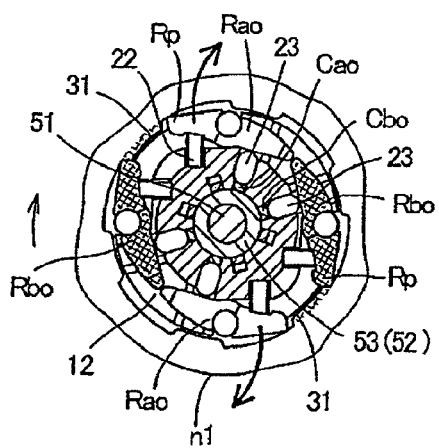
Figure 20D:
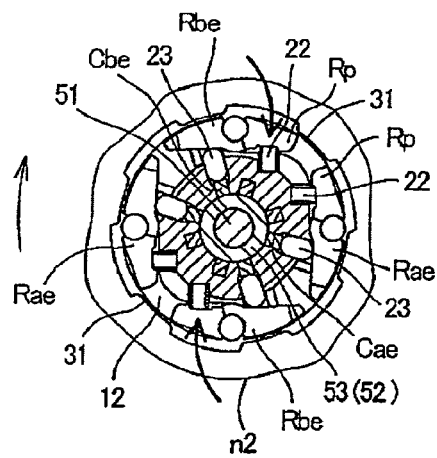

In the state illustrated in FIGS. 14(a)-(d), for the second driven speed-change gear n2, while the normal rotation even-numbered stage cam rods Cae move without resistance, the pin members 23 do not go far enough to go into the cam grooves v2 so that the even-numbered stage swing claw members Rae and Rbe remain unchanged (see FIGS. 14(b) and (d)).

Incidentally, the normal rotation odd-numbered stage cam rods Cao stop together with the spring holder 53h, engaging therewith, of the lost motion mechanism 53. Therefore, also the reverse rotation even-numbered stage cam rods Cbe engaging with the spring holder 53h is stopped.

In the state where the normal rotation odd-numbered cam rods Cao are stopped, when the control rods 51 are further moved and reach the second-speed position, also the normal rotation even-numbered cam rods Cae are further rightward moved along with the reverse rotation odd-numbered stage cam rods Cbo. Then, as illustrated in FIG. 15(b), the pin members 23 go into the cam grooves v2 of the normal rotation even-numbered stage cam rods Cae. Thus, the normal rotation even-numbered stage swing claw members Rae are swung by the biasing forces of the compression springs 22 and the centrifugal forces of the engaging claw portions Rp to allow the engaging claw portions Rp to project outward (see FIG. 15(d)).

Incidentally, the reverse rotation even-numbered stage cam rods Cbe remain stopped so that also the reverse rotation even-numbered stage swing claw members Rbe allow the engaging claw portions Rp to remain inwardly retracted.

In this way, the engaging projections 31 of the second driven speed-change gear n2 rotating at higher speed than the counter gear shaft 12 rotating together with the first driven speed-change gear n1 catch up with and come into abutment against the outward projecting engaging claw portions Rp of the normal rotation even-numbered step swing claw members Rae (see FIG. 16(d)).

With reference to FIGS. 16(c) and (d), at this moment, the abutment of the engaging projections 31 of the second driven speed-change gear n2 against the normal rotation even-numbered stage swing claw members Rae occur concurrently with the abutment of the engaging projections 31 of the first driven speed-change gear n1 against the normal rotation odd-numbered stage swing claw members Rao.

In this way, immediately thereafter, the second driven speed-change gear n2 rotating at higher speed allows the counter gear shaft 12 to begin to rotate at the same rotation speed as the second driven speed-change gear n2 (see FIG. 17(d)). This rotation causes the engaging claw portions Rp of the normal rotation odd-numbered stage swing claw members Rao to disengage from the engaging projections 31 of the first driven speed-change gears n1, executing actual upshift from the first-speed to the second-speed.

The disengagement of the engaging claw portions Rp of the normal rotation odd-numbered stage swing claw members Rao from the engaging protrusions 31 of the first driven speed-change gear n1 eliminates friction resistance acting to secure the normal rotation odd-numbered stage swing claw members Rao. Thereafter, the normal rotation odd-numbered stage cam rods Cao biased by the coil spring 53s of the lost motion mechanism 53 are moved rightward so that the pin members 23 put in the cam grooves v1 come out therefrom. Thus, the normal rotation odd-numbered stage swing claw members Rao are swung to allow the engaging claw portions Rp to be retracted inwardly (see FIG. 17(c)).

The movement of the normal rotation odd-numbered stage cam rods Cao moves also the reverse rotation even-numbered stage cam rods Cbe via the spring holder 53h of the lost motion mechanism 53. The pin members 23 go into the cam grooves v2 of the reverse rotation even-numbered stage cam rods Cbe to swing the reverse rotation even-numbered stage swing claw members Rbe, which allows the engaging claw portions Rp to project outwardly, completing shifting (see FIG. 17(d)).

In this way, the shifting operation from the first-speed to the second-speed is completed. The state illustrated in FIGS. 17(a)-(d) is a second-speed state.

As described above, when upshift is executed from the first-speed state to the second-speed state reduced in reduction ratio by one stage, as illustrated in FIGS. 16(a)-(d), the engaging projections 31 of the first driven speed-change gear n1 come into abutment against and engagement with the engaging claw portions Rp of the normal rotation odd-numbered stage claw members Rao. In the state where the counter gear shaft 12 is rotated at the same speed as the first driven speed-change gear n1, the engaging projections 31 of the second driven speed-change gear n2 rotating at higher speed catches up with and comes into abutment against the engaging claw portions Rp of the normal rotation even-numbered stage swing claw members Rae. The counter gear shaft 12 is rotated at higher speed along with the second driven speed-change gear n2 for executing shift. The engaging claw portions Rp of the normal rotation odd-numbered stage swing claw members Rao naturally move away from the engaging projections 31 of the first driven speed-change gear n1 for smooth disengagement. Thus, the smooth upshift can be executed through the smooth operation without force for releasing the engagement.

Similarly, upshift from the second-speed to the third-speed, from the third-speed to the fourth-speed, from the fourth-speed to the fifth-speed, from the fifth-speed to the sixth-speed is as below. In the state where the driven speed-change gear n is engaged with the swing claw members R, the driven speed-change gear n reduced in reduction ratio by one stage comes into engagement with the swing claw members R for executing upshift. In this way, the smooth upshift can be executed, without the necessity of a shift clutch, through smooth operation without force for releasing the engagement, without any loss of switching time during the upshift, without escape of the driving force, and with a reduced shift shock.

For example, in the first-speed state, as illustrated in FIG. 13(c), the normal rotation odd-numbered swing claw members Rao are engaged with the engaging projections 31 of the first driven speed-change gear n1 and at the same time the engaging claw portions Rp of the reverse rotation odd-numbered stage swing claw members Rbo on the other side is located close to the engaging projections 31 in such a state as to be engageable therewith.

Vehicle speed may be reduced so that a driving force is applied from the rear wheel to the counter gear shaft 12 to change the direction of the drive force. In such a case, the engagement of the engaging projections 31 of the first driven speed-change gear n1 is promptly switched from the normal rotation odd-numbered claw members Rao to the reverse rotation odd-numbered stage swing claw members Rbo. Thus, the engagement can smoothly be taken over and maintained.

A description is next given of a process for downshift from the second-speed state to the first-speed state increased in reduction ratio by one stage during reducing vehicle speed with reference to FIGS. 18 to 20(a)-(d).

FIGS. 18(a)-(d) illustrate a speed-change state being in the second-speed state immediately after speed reduction.

Speed reduction allows the drive force to act on the counter gear shaft 12 from the rear wheel. As illustrated in FIG. 18(d), the engaging claw portions Rp of the reverse rotation even-numbered stage swing claw members Rbe in the engageable state are brought into engagement with the engaging projections 31 of the second driven speed-change gear n2 lowering in rotation speed. This engagement transmits the rotational power of the counter gear shaft 12 to the second driven speed-change gear n2, that is, the so-called engine brake works.

In this state, to downshift to the first-speed, the shift select lever is manually operated to turn the shift drum 67 in the direction reverse to the above-description by a given amount to move the control rod 51 axially leftward. This movement is about to simultaneously move the eight cam rods Cao, Cao, Cae, Cae, Cbo, Cbo, Cbe and Cbe via the coil springs 52s and 53s of the lost motion mechanisms 52 and 53 axially leftward. However, the reverse rotation even-numbered stage swing claw members Rbe operated via the pin members 23 come into engagement with the engaging projections 31 of the second driven speed-change gear n2 to receive the power from the second driven speed-change gear n2. Therefore, the reverse rotation even-numbered stage cam rods Cbe receive such significantly large friction resistance as to swing the reverse rotation even-numbered stage swing claw members Rbe for releasing the engagement. When the pin members 23 are about to ride on the inclined lateral surface of the cam grooves v2, the reverse rotation even-numbered stage cam rods Cbe are stopped so that the engagement remains not released (see FIGS. 19(b) and (d)).

Incidentally, also the normal rotation odd-numbered stage cam rods Cao along with the reverse rotation even-numbered stage cam rods Cbe is in the stopped state via the spring holder 53h of the lost motion mechanism 53.

On the other hand, the normal rotation even-numbered stage swing claw members Rae operated via the pin members 23 are not engaged with the engaging projection 31 of the second driven speed-change gear n2. Therefore, the normal rotation even-numbered stage cam rods Cae are moved leftward without so much resistance to allow the pin members 23 put in the cam grooves v2 to come out therefrom for projection. This swings the normal rotation odd-numbered swing claw members Rae to inwardly retract the engaging claw portions Rp (see FIG. 19(d)).

In the first driven speed-change gear nil, the reverse rotation odd-numbered stage cam rods Cbo are moved leftward without resistance to allow the pin members 23 to go into the cam grooves v1 of the reverse rotation odd-numbered stage cam rods Cbo (see FIG. 19(a)). In addition, the reverse rotation odd-numbered swing claw members Rbo are swung by the biasing forces of the compression springs 22 and by the centrifugal forces of the engaging claw portions Rp to allow the engaging claw portions Rp to project outwardly (see FIG. 19(c)).

After the normal rotation even-numbered stage swing claw members Rae have retracted the engaging claw portions Rp inwardly, the reverse rotation odd-numbered stage swing claw members Rbo allow the engaging claw portions Rp to project outwardly.

The reverse rotation odd-numbered stage swing claw members Rbo rotate together with the counter gear shaft 12 and catch up with and come into abutment against the engaging projections 31 of the first driven speed-change gears n1. In this case, as illustrated in FIGS. (c) and (d), there is a moment when the engaging projections 31 of the second driven speed-change gear n2 and the engaging projections 31 of the first driven speed-change gear n1 come into simultaneous abutment against the engaging claw portions Rp of the reverse rotation even-numbered stage swing claw members Rbe and the engaging claw portions Rp of the reverse rotation odd-numbered stage swing claw members Rbo, respectively.

Immediately thereafter, the engagement with the first driven speed-change gear n1 rotating at lower speed becomes effective and the engagement with the second driven speed-change gear n2 is released, thus executing the downshift from the second-speed to the first-speed.

The engagement between the engaging projections 31 of the second driven speed-change gear n2 with the reverse rotation even-numbered stage cam rods Cbe is released to eliminate friction resistance acting to secure the reverse rotation even-numbered stage swing claw members Rbe. Then, the reverse rotation even-numbered stage cam rods Cbe biased by the coil spring 53s of the lost motion mechanism 53 is moved leftward to allow the pin members 23 put in the cam grooves v2 to come out therefrom (see FIG. 20(b)). This swings the reverse rotation even-numbered swing claw members Rbe to retract the engaging claw members Rp inwardly (see FIG. 20(d)).

The movement of the reverse rotation even-numbered stage cam rods Cbe moves also the normal rotation odd-numbered stage cam rods Cao via the spring holder 53h of the lost motion mechanism 53 to allow the pin members 23 to go into the cam grooves v1 of the normal rotation odd-numbered stage cam rods Cao. This swings the normal rotation odd-numbered stage swing claw members Rao to allow the engaging claw members Rp to project outwardly, thus completing the shifting (see FIG. 20(c)).

In this state, the shifting operation from the second-speed to the first-speed is completed.

As describe above, when downshift is executed from the second-speed state to the first-speed state increased in reduction ratio by one stage, as illustrated in FIGS. 19(a)-(d), the engaging claw portions Rp of the reverse rotation even-numbered stage swing claw members Rbe come into abutment against and into engagement with the engaging protrusions 31 of the second speed-change gear n2. In this state, the engaging claw portions Rp of the reverse rotation odd-numbered stage swing claw members Rbo catch up with and come into abutment against the engaging protrusions 31 of the first driven speed-change gear n1 rotating at lower speed for switching the engagement. The engagement between the engaging protrusions 31 of the second driven speed-change gear n2 and the engaging claw portions Rp of the reverse rotation odd-numbered stage claw members Rbe is smoothly released. Thus, smooth downshift can be executed through the smooth operation without the necessity of force for releasing the engagement.

Similarly, downshift from the sixth-speed to the fifth-speed, from the fifth-speed to the fourth-speed, from the fourth-speed to the third-speed and from the third-speed to the second-speed is as below. In the state where the driven speed-change gear n is engaged with the swing claw members R, the swing claw members R come into engagement with the driven speed-change gear n increased in reduction ratio by one stage for executing downshift. In this way, the smooth downshift can be executed through smooth operation without the necessity of force for releasing the engagement, without the necessity of a shift clutch, without any loss of switching time during the downshift, without escape of the driving force, and with a reduced shift shock.

For example, in the second-speed state, as illustrated in FIG. 18(d), the reverse rotation even-numbered step swing claw members Rbe are engaged with the engaging projections 31 of the second speed-change gear n2 and at the same time the engaging claw members Rp of the normal rotation even-numbered stage swing claw members Rae on the other side are located close to the engaging projections 31 and in such a state as to be engageable with the projections 31.

Vehicle speed may be increased so that the driving force is applied from the internal combustion engine to the second driven speed-change gear n2 to change the direction of the drive force. In such a case, the engagement of the engaging projections 31 of the second driven speed-change gear n2 is promptly switched from the reverse rotation even-numbered stage swing claw members Rbe to the normal rotation even-numbered stage swing claw members Rae. Thus, the engagement can smoothly be taken over and maintained.

Incidentally, during acceleration caused by the drive of the internal combustion engine, even if the control rod 51 is moved axially rightward in order to execute downshift, the multistage transmission 10 of the present embodiment cannot release the engagement between the driven speed-change gear n and the swing claw members R transmitting power therebetween if nothing is done. Consequently, to execute downshift during the acceleration, the friction clutch 5 is temporarily disengaged to reduce speed before shifting operation. In this state, the shifting operation is executed to smoothly switch to the engagement between the swing claw members R and the driven speed-change gear n increased in reduction ratio by one stage. Then, the friction clutch 5 is engaged for the acceleration.

If the friction clutch 5 is not used, the rotation speed of the driven speed-change gear n is temporarily lowered by drive source rotation speed reduction means such as ignition timing control or fuel injection amount control. Thus, downshift can smoothly be executed even during acceleration.

When vehicle speed is reduced so that a drive force is applied from the rear wheel to the counter gear shaft 12, if the control rod 51 is moved axially leftward in order to execute upshift, such shift cannot be executed. Thereafter, when acceleration is executed, the driven speed-change gear n reduced in reduction ratio by one stage is engaged with the swing claw members R to cause a possible shift shock. Therefore, upshift operation during deceleration is prohibited to make it possible to prevent the occurrence of the shift shock.

The cam rods C fitted to the cam grooves 12g formed on the hollow inner circumferential surface of the counter gear shaft 12 are axially moved to advance and retract the pin members 23 fitted into the desired positions of the counter gear shaft 12, thereby swinging the swing claw members R. In this way, the engagement with and disengagement from the engaging projections 31 of the driven speed-change gear n are executed. The cam rods C are moved only by a small amount to thereby advance and retract the desired pin members 23 to switch the engagement for shifting. Thus, the configuration can be enabled in which the adjacent driven speed-change gears n supported by the counter gear shaft 12 are made close to each other as illustrated in FIG. 1. This can reduce the axial width of the multistage transmission 10.

According to the multistage transmission 10, the biasing means for swingably biasing the swing claw member R is the compression spring 22 interposed between the inner surface of the engaging claw portion Rp of the swing claw member R and the spring-receiving portion 12d of the counter gear shaft 12. Therefore, the axial space dedicated to the spring is not necessary so that the axial enlargement of the counter gear shaft 12 can be avoided.

The compression spring 22 is disposed at the center of the axial width of the swing claw member R so that the swing claw member R per se can be formed symmetrical on both sides in the axial direction. Therefore, the swing claw members of two kinds adapted to establish engagement between the driven speed-change gear n and the counter gear shaft 12 and release the engagement in both relative rotation directions thereof can be made to have the same shape. That is to say, it is not necessary to prepare swing claw members different in shape from each other.

The swing claw member R is such that the pin-receiving portion Rr receiving the pin member 23 is formed narrower in width than the engaging claw portion Rp located on the side opposite thereto with respect to the swing center. Therefore, a centrifugal force largely acting on the wide engaging claw portion Rp can swing the swing claw member R toward the engaging side.

Since the pin-receiving portion Rr needs only to have the width enough to receive only the pin member 23, the swing claw member R can be made small and the other engaging claw portion Rp can easily be swung by the centrifugal force.

The compression spring 22 biasing the swing claw member R is formed in an oval figure with a major axis extending in the axial direction of the counter gear shaft 12. This oval-shaped compression spring 22 has the major axis greater than the width of the pin-receiving portion Rr of the sing claw member R. Therefore, even if the circumferential groove 12cv adapted to receive the pin-receiving portion Rr of the swing claw member R swingably fitted thereinto is formed on the counter gear shaft 12 to circumferentially extend around one circle, the compression spring 22 can be received to straddle the circumferential groove 12cv.

Thus, the machining of the counter gear shaft 12 can be facilitated and the swing claw member R can stably be assembled to the counter gear shaft 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multistage transmission in which a plurality of drive gears and driven gears are rotatably supported by respective parallel gear shafts in a constant-mesh state for each speed-change stage, one of the plurality of drive gears and driven gears is secured to a gear shaft and an engaging means provided between the other of the plurality of drive gears and driven gears and the gear shaft to establish engagement therebetween is switchably driven to execute shifting, the engaging means comprising:
an engaging projection formed on an inner circumferential surface of each gear to project therefrom and have an engaging surface in a circumferential direction;
a cam rod brought into axially movably slidable contact with a hollow inner circumferential surface of the gear shaft and formed with a plurality of cam grooves on a slidable contact surface at desired axial positions;
a pin member insertably fitted into a through-hole radially passing through the gear shaft at a desired position and advancing and retracting while coming into alternate contact with the slidable contact surface and cam grooves of the axially moved cam rod;
a swing claw member pivotally supported for swing by a spindle pin provided on the gear shaft, having a pin-receiving portion adapted to receive the pin member and an engaging claw portion coming into abutment against an engaging surface of the engaging projection, on respective sides opposite to each other with respect to the swing center, and swung by the advancement and retraction of the pin member to allow the engaging claw portion to establish engagement with and disengagement from the engaging projection; and
biasing means for biasing the swing claw member in a swing direction of bringing the engaging claw portion into engagement with the engaging surface of the engaging projection,
wherein the biasing means is a compression spring interposed between the inner surface of the engaging claw portion of the swing claw member and a surface of the gear shaft opposed thereto.

2. The multistage transmission according to claim 1,
wherein the swing claw member is such that the pin-receiving portion is formed narrower in width than the engaging claw portion located on a side opposite to the pin-receiving portion with respect to the swing center.

3. The multistage transmission according to claim 1,
wherein the compression spring is formed in an oval figure with a major axis extending in an axial direction of the gear shaft, and
the oval-shaped compression spring has the major axis greater than a width of the pin-receiving portion of the swing claw member.

4. The multistage transmission according to claim 2,
wherein the compression spring is formed in an oval figure with a major axis extending in an axial direction of the gear shaft, and
the oval-shaped compression spring has the major axis greater than a width of the pin-receiving portion of the swing claw member.

5. The multistage transmission according to claim 1, wherein the swing claw member also includes a wide end portion, and the pin-receiving portion is disposed between the wide end portion and the engaging claw portion.

6. The multistage transmission according to claim 1, wherein the pin-receiving portion is narrower than each of the wide end portion and the engaging claw portion, and is centered in an axial direction with respect to the wide end portion and the engaging claw portion.

7. The multistage transmission according to claim 1, wherein the part of the inner surface of the engaging claw portion upon which to biasing means is pressed is substantially flat.

8. The multistage transmission according to claim 1, wherein the cam rod includes an odd number of cam rods, the engaging projection formed on the inner surface of each of the gears includes an even number of engaging projections, and the swing claw member includes an even number of swing claw members.

9. The multistage transmission according to claim 8, wherein the number of engaging projections is smaller than the number of cam rods and larger than the number of engaging projections.

10. A multistage transmission for a motorcycle in which a plurality of drive gears and driven gears are rotatably supported by respective parallel gear shafts in a constant-mesh state for each speed-change stage, one of the plurality of drive gears and driven gears is secured to a gear shaft and an engaging means provided between the other of the plurality of drive gears and driven gears and the gear shaft to establish engagement therebetween is switchably driven to execute shifting,
the engaging means comprising:
an engaging projection formed on an inner circumferential surface of each gear to project therefrom and have an engaging surface in a circumferential direction;
a cam rod brought into axially movably slidable contact with a hollow inner circumferential surface of the gear shaft and formed with a plurality of cam grooves on a slidable contact surface at desired axial positions;
a pin member insertably fitted into a through-hole radially passing through the gear shaft at a desired position and advancing and retracting while coming into alternate contact with the slidable contact surface and cam grooves of the axially moved cam rod;
a swing claw member pivotally supported for swing by a spindle pin provided on the gear shaft, having a pin-receiving portion adapted to receive the pin member and an engaging claw portion coming into abutment against an engaging surface of the engaging projection, on respective sides opposite to each other with respect to the swing center, and swung by the advancement and retraction of the pin member to allow the engaging claw portion to establish engagement with and disengagement from the engaging projection; and
biasing means for biasing the swing claw member in a swing direction of bringing the engaging claw portion into engagement with the engaging surface of the engaging projection,
wherein the biasing means is a compression spring interposed between the inner surface of the engaging claw portion of the swing claw member and a surface of the gear shaft opposed thereto,
wherein the number of drive and driven gears is six.

11. The multistage transmission for a motorcycle according to claim 10,
wherein the swing claw member is such that the pin-receiving portion is formed narrower in width than the engaging claw portion located on a side opposite to the pin-receiving portion with respect to the swing center.

12. The multistage transmission for a motorcycle according to claim 10,
wherein the compression spring is formed in an oval figure with a major axis extending in an axial direction of the gear shaft, and
the oval-shaped compression spring has the major axis greater than a width of the pin-receiving portion of the swing claw member.

13. The multistage transmission for a motorcycle according to claim 11,
wherein the compression spring is formed in an oval figure with a major axis extending in an axial direction of the gear shaft, and
the oval-shaped compression spring has the major axis greater than a width of the pin-receiving portion of the swing claw member.

14. The multistage transmission for a motorcycle according to claim 10, wherein the swing claw member also includes a wide end portion, and the pin-receiving portion is disposed between the wide end portion and the engaging claw portion.

15. The multistage transmission for a motorcycle according to claim 10, wherein the pin-receiving portion is narrower than each of the wide end portion and the engaging claw portion, and is centered in an axial direction with respect to the wide end portion and the engaging claw portion.

16. The multistage transmission for a motorcycle according to claim 10, wherein the part of the inner surface of the engaging claw portion upon which to biasing means is pressed is substantially flat.

17. The multistage transmission for a motorcycle according to claim 10, wherein the cam rod includes an odd number of cam rods, the engaging projection formed on the inner surface of each of the gears includes an even number of engaging projections, and the swing claw member includes an even number of swing claw members.

18. The multistage transmission for a motorcycle according to claim 17, wherein the number of engaging projections is smaller than the number of cam rods and larger than the number of engaging projections.

19. A multistage transmission in which a plurality of drive gears and driven gears are rotatably supported by respective parallel gear shafts in a constant-mesh state for each speed-change stage, one of the plurality of drive gears and driven gears is secured to a gear shaft and an engaging means provided between the other of the plurality of drive gears and driven gears and the gear shaft to establish engagement therebetween is switchably driven to execute shifting, the engaging means comprising:

an engaging projection formed on an inner circumferential surface of each gear to project therefrom and have an engaging surface in a circumferential direction;

a cam rod brought into axially movably slidable contact with a hollow inner circumferential surface of the gear shaft and formed with a plurality of cam grooves on a slidable contact surface at desired axial positions;

a pin member insertably fitted into a through-hole radially passing through the gear shaft at a desired position and advancing and retracting while coming into alternate contact with the slidable contact surface and cam grooves of the axially moved cam rod;

a swing claw member pivotally supported for swing by a spindle pin provided on the gear shaft, having a pin-receiving portion adapted to receive the pin member and an engaging claw portion coming into abutment against an engaging surface of the engaging projection, on respective sides opposite to each other with respect to the swing center, and swung by the advancement and retraction of the pin member to allow the engaging claw portion to establish engagement with and disengagement from the engaging projection; and biasing means for biasing the swing claw member in a swing direction of bringing the engaging claw portion into engagement with the engaging surface of the engaging projection, wherein the biasing means is a compression spring interposed between the inner surface of the engaging claw portion of the swing claw member and a surface of the gear shaft opposed thereto, wherein the swing claw member includes multiple swing claw member which are identical to each other.

20. The multistage transmission according to claim 19, wherein the swing claw member is such that the pin-receiving portion is formed narrower in width than the engaging claw portion located on a side opposite to the pin-receiving portion with respect to the swing center.

* * * * *